(12) United States Patent
Kurashige et al.

(10) Patent No.: US 9,179,065 B2
(45) Date of Patent: Nov. 3, 2015

(54) IMAGE PROCESSING APPARATUS, IMAGE PROCESSING METHOD, AND PROGRAM PRODUCT

(71) Applicant: JVC KENWOOD Corporation, Yokohama (JP)

(72) Inventors: Norio Kurashige, Machida (JP); Takashi Kiyofuji, Yokohama (JP); Kouji Tanaka, Fujisawa (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 196 days.

(21) Appl. No.: 13/965,852

(22) Filed: Aug. 13, 2013

(65) Prior Publication Data

US 2013/0329069 A1  Dec. 12, 2013

Related U.S. Application Data

(63) Continuation of application No. PCT/JP2012/053875, filed on Feb. 17, 2012.

(30) Foreign Application Priority Data

Feb. 18, 2011 (JP) .................................. 2011-033978

(51) Int. Cl.
*H04N 5/232* (2006.01)
*H04N 5/77* (2006.01)
(Continued)

(52) U.S. Cl.
CPC ............. *H04N 5/23245* (2013.01); *H04N 1/40* (2013.01); *H04N 5/23229* (2013.01);
(Continued)

(58) Field of Classification Search
USPC ....................................................... 348/220.1
See application file for complete search history.

(56) References Cited

U.S. PATENT DOCUMENTS 6,137,534 A  10/2000  Anderson
7,319,463 B2  1/2008  Ueno
(Continued)

FOREIGN PATENT DOCUMENTS

JP  2000-513542  10/2000
JP  2000-324434  11/2000
(Continued)

OTHER PUBLICATIONS

International Search Report in PCT International Application No. PCT/JP2012/053875, dated May 22, 2012.

*Primary Examiner* — Roberto Velez
*Assistant Examiner* — Stephen Coleman
(74) *Attorney, Agent, or Firm* — Venable LLP; Michael A. Sartori

(57) ABSTRACT

An image processing apparatus includes: an imaging device; a main memory that stores motion picture data acquired by the imaging device; a motion picture compressing unit that compresses the motion picture data stored in the main memory; a still image frame acquiring unit that acquires a still image frame at arbitrary timing from the motion picture data acquired by the imaging device; a line memory that stores still image data that is a part of the still image frame acquired by the still image frame acquiring unit; and a still image compressing unit that performs a compression process of the still image data stored in the line memory. The still image compressing unit compresses the still image data in real time. The main memory stores the motion picture data and stores compressed data that is compressed in real time by the still image compressing unit.

11 Claims, 15 Drawing Sheets

(51) Int. Cl.
   *H04N 5/907*      (2006.01)
   *H04N 9/804*      (2006.01)
   *H04N 1/40*       (2006.01)
   *H04N 19/436*     (2014.01)
   *H04N 21/4223*    (2011.01)
   *H04N 21/433*     (2011.01)
   *H04N 21/4402*    (2011.01)

(52) U.S. Cl.
   CPC .............. *H04N 5/772* (2013.01); *H04N 5/907* (2013.01); *H04N 9/8042* (2013.01); *H04N 19/436* (2014.11); *H04N 21/4223* (2013.01); *H04N 21/4334* (2013.01); *H04N 21/4402* (2013.01)

(56) References Cited

U.S. PATENT DOCUMENTS

| | | | |
|---|---|---|---|
| 7,369,683 | B2 | 5/2008 | Kobayashi et al. |
| 8,098,291 | B2 | 1/2012 | Kawamura et al. |
| 8,194,155 | B2 | 6/2012 | Kiba et al. |

FOREIGN PATENT DOCUMENTS

| | | |
|---|---|---|
| JP | 2004-129242 | 4/2004 |
| JP | 2007-135102 | 5/2007 |
| JP | 2007-228119 | 9/2007 |
| JP | 2009-200627 | 9/2009 |
| JP | 2009-130562 | 11/2009 |
| JP | 2010-141687 | 6/2010 |
| WO | WO-2005/020566 | 3/2005 |

TWO-SIDE
CONFIGURATION

THREE-SIDE
CONFIGURATION

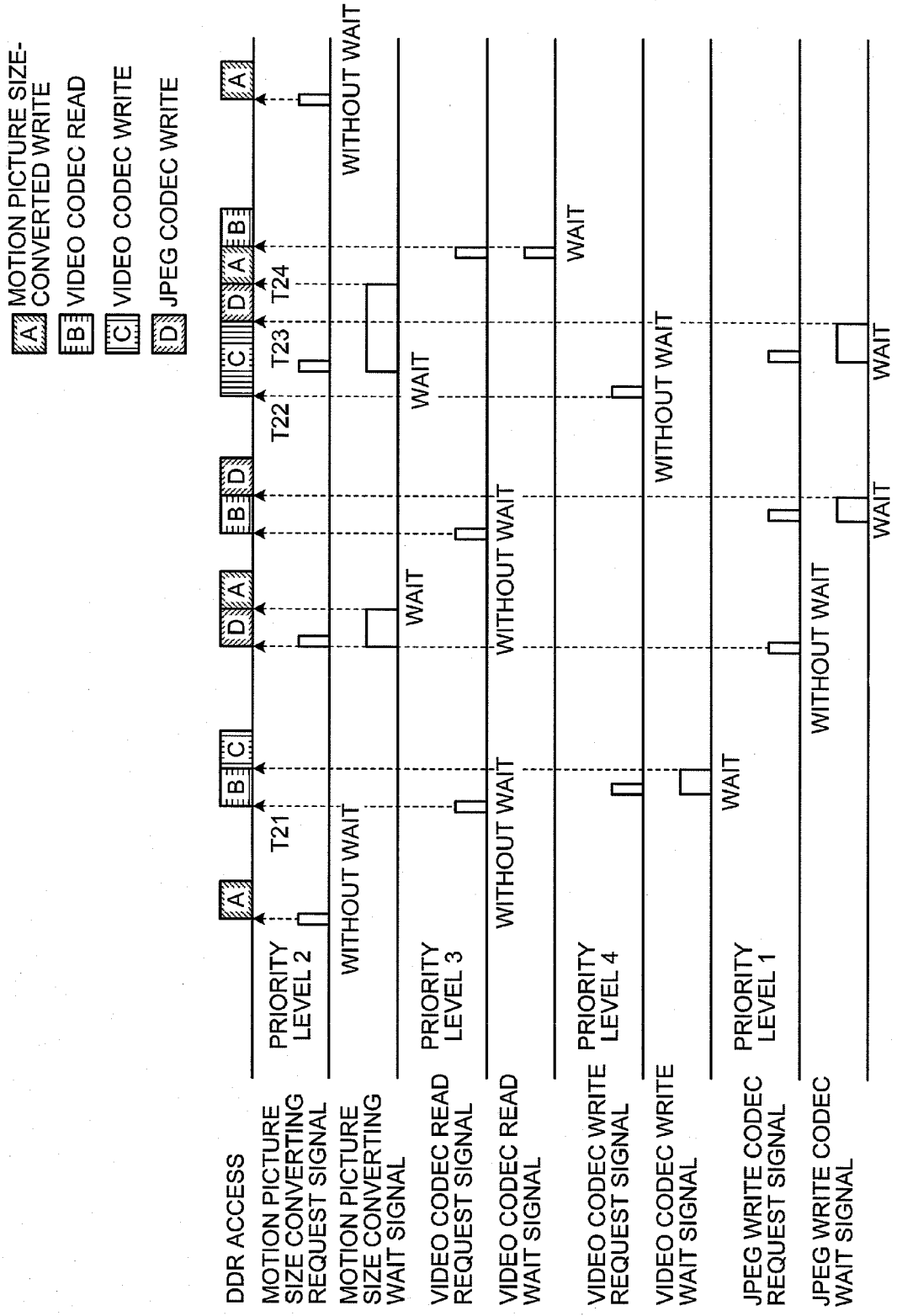

IMAGE PROCESSING APPARATUS, IMAGE PROCESSING METHOD, AND PROGRAM PRODUCT

CROSS-REFERENCE TO RELATED APPLICATIONS

This application is a continuation of International Application No. PCT/JP2012/053875, filed on Feb. 17, 2012 which claims the benefit of priority of the prior Japanese Patent Application No. 2011-033978, filed on Feb. 18, 2011, the entire contents of which are incorporated herein by reference.

BACKGROUND OF THE INVENTION

1. Field of the Invention

The present invention relates to an image processing apparatus, an image processing method, and a program having a function for capturing a still image while a motion picture is captured, and more particularly, to an image processing apparatus, an image processing method, and a program product that are suitable for acquiring still image data encoded at a high speed in real time.

2. Description of the Related Art

In conventional image capturing apparatuses having a function for capturing a still image together with capturing a motion picture such as a digital camera and a digital video camera, similarly to an image capturing apparatus capturing only still images, generally, image data is stored as a non-compressed file or is stored as compressed data in the format of the Joint Photographic Experts Group (JPEG) or the like when a still image is captured and formed as a file. When a still image is formed as a file, usually, a sub-image (horizontal 160 pixels×vertical 120 pixels), which is used as an index, called a thumbnail is packaged in a file together with a main image having resolution that is the same as the resolution of an imaging device. From this, when a still image is reproduced, a thumbnail display of sub-images as index images having a small size is performed, and a user can check the still image and efficiently select the still image. This is defined in an exchangeable image file format (EXIF) that is an image file specification for digital cameras or the like.

As a conventional image capturing apparatus having a function for capturing a still image together with capturing a motion picture, for example, an electronic camera disclosed in Japanese Laid-open Patent Publication No. 2000-324434 has been known. In Japanese Laid-open Patent Publication No. 2000-324434, an electronic camera for performing recording such that a user does not feel strangeness at the time of reproducing a motion picture even when there is a non-continuous portion in the captured motion picture by preventing the number of captured still images from being limited in accordance with an internal memory has been disclosed.

In the electronic camera disclosed in Japanese Laid-open Patent Publication No. 2000-324434, when an instruction of a request for recording a still image is given during recording a motion picture, a captured still-image is stored in a storage unit in response to the request for recording a still image, the storage unit is prohibited from reading an image from an imaging device during a predetermined time, and, by repeatedly reading images stored in the storage unit during the time, captured still images are recorded in a motion picture recording unit as a motion picture in advance. In addition, during the motion picture processing of captured still images, still image processing is performed in which a captured still image stored in the storage unit is recorded in a still image recording unit as a still image, the prohibition is cancelled when the recording of the captured still image in the still image recording unit as a still image is completed or when a predetermined time elapses thereafter, and the recording operation is resumed in which images acquired from the imaging device are recorded in the motion picture recording unit as a motion picture.

In conventional image capturing apparatuses including that disclosed in Japanese Laid-open Patent Publication No. 2000-324434, generally, in order to capture a still image, image data acquired through an imaging device or the like is stored once in a main memory, and, after image correction or the like is performed for the image data, the image data is compressed in the JPEG format or the like, whereby a main image stream is generated. In addition, as necessary, the size of the image stored in the main memory is converted into the size of a thumbnail image, the image is compressed in the JPEG format or the like, whereby a thumbnail stream is generated. Then, by packaging these as an EXIF, a general JPEG file is generated. In a series of this process (hereinafter, referred to as a still image encoding process) due to processes such as:

(1) a process of writing image data into the main memory;

(2) a process of encoding read image data into the JPEG format while the image data is being read out from the main memory; and (3) a process of writing encoded data into the main memory as a stream; many accesses to the main memory occur, thus the memory bus bandwidth is pressed. Accordingly, it is necessary to increase the memory processing clock frequency or widen the bus width, and consequently, there are problems of a high cost, an increase in the power consumption, and the like.

When the still image encoding process is performed at a high speed, the above-described problems become remarkable. Particularly, in a case where a still image is captured together with capturing a motion picture, a series of the still image encoding processes is necessary in which motion picture data acquired from the imaging device is written into the main memory, still image data is written into the main memory, the data is encoded and is rewritten into the main memory. However, in such a case, when the process of writing motion picture data into the main memory and the process of writing still image data into the main memory are simultaneously performed, the bus bandwidth of the memory is insufficient, and accordingly, it is impossible to acquire the still image data at a high speed.

In other words, as in the case of a conventional image capturing apparatus, in a case where the still image encoding process is performed simultaneously with a process accompanied with the capturing of a motion picture after still image data is written into a frame memory, the bandwidth of the bus of the frame memory is insufficient, and accordingly, writing and reading cannot be simultaneously performed during the same frame period. Accordingly, the still image encoding process for about ten or more frames or all the frames cannot be performed, and, for example, in the case of a motion picture configured by 60 frames per second, there is a problem in that it is necessary to select the number of frames that can be processed from among 60 frames and to form the selected frames as a JPEG file.

In addition, in a case where a reduced size such as ½ or ⅓ instead of the size of the image output from the imaging device is desired by the user as the size of the main image, it requires a time for the process of resizing the main image, and accordingly, the still image processing cannot be performed at a high speed.

SUMMARY OF THE INVENTION

It is an object of the present invention to at least partially solve the problems in the conventional technology.

According to an aspect of the present invention an image processing apparatus includes: an imaging device; a main memory that stores motion picture data acquired by the imaging device; a motion picture compressing unit that compresses the motion picture data stored in the main memory; a still image frame acquiring unit that acquires a still image frame at arbitrary timing from the motion picture data acquired by the imaging device; a line memory that stores still image data that is a part of the still image frame acquired by the still image frame acquiring unit; and a still image compressing unit that performs a compression process of the still image data stored in the line memory, and the still image compressing unit compresses the still image data in real time in parallel with storage of the motion picture data into the main memory, and the main memory stores the motion picture data and stores compressed data that is compressed in real time by the still image compressing unit.

According to another aspect of the present invention an image processing method includes: storing motion picture data acquired by an imaging device in a main memory; storing still image data that is a part of a still image frame acquired at arbitrary timing from the motion picture data acquired by the imaging device in a line memory; performing a compression process of the still image data stored in the line memory in real time; storing compressed data processed to be compressed in real time in the performing of a compression process of the still image in the main memory; and storing the motion picture data acquired by the imaging device in the main memory in parallel with the storing in the line memory, performing of a compression process of the still image data, or the storing of the still image.

According to still another aspect of the present invention a computer program product comprising a non-transitory computer usable medium having computer readable program causing a computer to execute: a recording process of a still image in parallel with a recording process of a motion picture, the program causing the computer to perform: storing motion picture data acquired by an imaging device in a main memory; storing still image data that is a part of a still image frame acquired at arbitrary timing from the motion picture data acquired by the imaging device in a line memory; performing a compression process of the still image data stored in the line memory in real time; storing compressed data processed to be compressed in real time in the performing of a compression process of the still image in the main memory; and storing the motion picture data acquired by the imaging device in the main memory in parallel with the storing in the line memory, performing of a compression process of the still image data, or the storing of the still image data.

In addition, the line memory is configured by n lines (here, n is an integer that is one or more) of three or more sides, and a part of the memory serves as a buffer absorbing variations in a processing rate in the process of compressing the still image data performed by the still image compressing unit and serves as a buffer adjusting timing when the compressed data after the compression process is stored in the main memory, and, by including line memories of three or more sides, timing when data after compression is stored in the main memory and the like can be controlled.

In addition, the above-described image processing apparatus further includes: a main image size converting unit; and a sub-image size converting unit. The main image size converting unit generates main image data by converting a size of the still image frame acquired by the still image frame acquiring unit in real time, and the sub-image size converting unit generates sub-image data by converting the size of the still image frame acquired by the still image frame acquiring unit in real time, whereby the size of the sub-image can be acquired together with the main image.

Furthermore, the sub-image size converting unit generates the sub-image data by converting a size of the main image data generated by the main image size converting unit in real time, and accordingly, the sub-image data is generated using data reduced to the size of the main image, whereby the sub-image size converting process can be easily performed.

In addition, the line memory stores a part of the main image data generated by the main image size converting unit, and the still image compressing unit compresses the main image data in real time in parallel with storing the motion picture data in the main memory and stores the sub-image data generated by the sub-image size converting unit in the main memory without being compressed. Accordingly, the sub-image data has a small size and thus, does not need to be compressed in real time.

Furthermore, the size converting unit includes a size conversion line memory, and the size conversion line memory includes a line memory storing the still image frame, a part of the main image data or the sub-image data. Accordingly, the output timing from the size converting unit can be adjusted.

In addition, the above-described image processing apparatus further includes a motion picture size converting unit, the motion picture size converting unit converts a size of the motion picture data acquired by the imaging device, and the main memory stores the motion picture data of which the size is converted by the motion picture size converting unit. Accordingly, the size of the motion picture data can be converted.

Furthermore, the main memory stores motion picture data acquired by decompressing compressed motion picture data read from an external memory, the line memory stores still image data that is a part of the still image frame acquired at arbitrary timing from any one of the motion picture acquired by the imaging device and the decompressed motion picture data stored in the main memory, and the still image compressing unit performs a compression process of the still image data stored in the line memory.

Accordingly, the still image frame is acquired from the non-compressed motion picture data stored in the main memory, and the compressed data thereof can be generated.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 16 is a diagram that illustrates the control of an arbiter in the image processing apparatus according to the second embodiment of the present invention.

DETAILED DESCRIPTION OF THE PREFERRED EMBODIMENTS

Hereinafter, specific embodiments of the present invention will be described in detail with reference to the drawings. In these embodiments, the present invention is applied to an image processing apparatus capable of acquiring a still image at a high speed in parallel with acquisition of a motion picture.

As described above, in a case where a still image is captured together with capturing a motion picture, conventionally, the bus bandwidth of a main memory is insufficient, and accordingly, assuming that there are 60 frames per second, only several to ten still image frames can be acquired. In contrast to this, since an image capturing apparatus as an image processing apparatus according to the present embodiments solve the above-described problem relating to the bus bandwidth of the main memory, and even in a case where a still image is captured together with capturing a motion picture, the image capturing apparatus can perform high-speed capturing of ten or more frames. In addition, usually, at a speed corresponding to the rate of frames output from the imaging device, for example, all the frames of 60 frames per second can be acquired as still image frames.

First Embodiment of Present Invention

Figure 1:
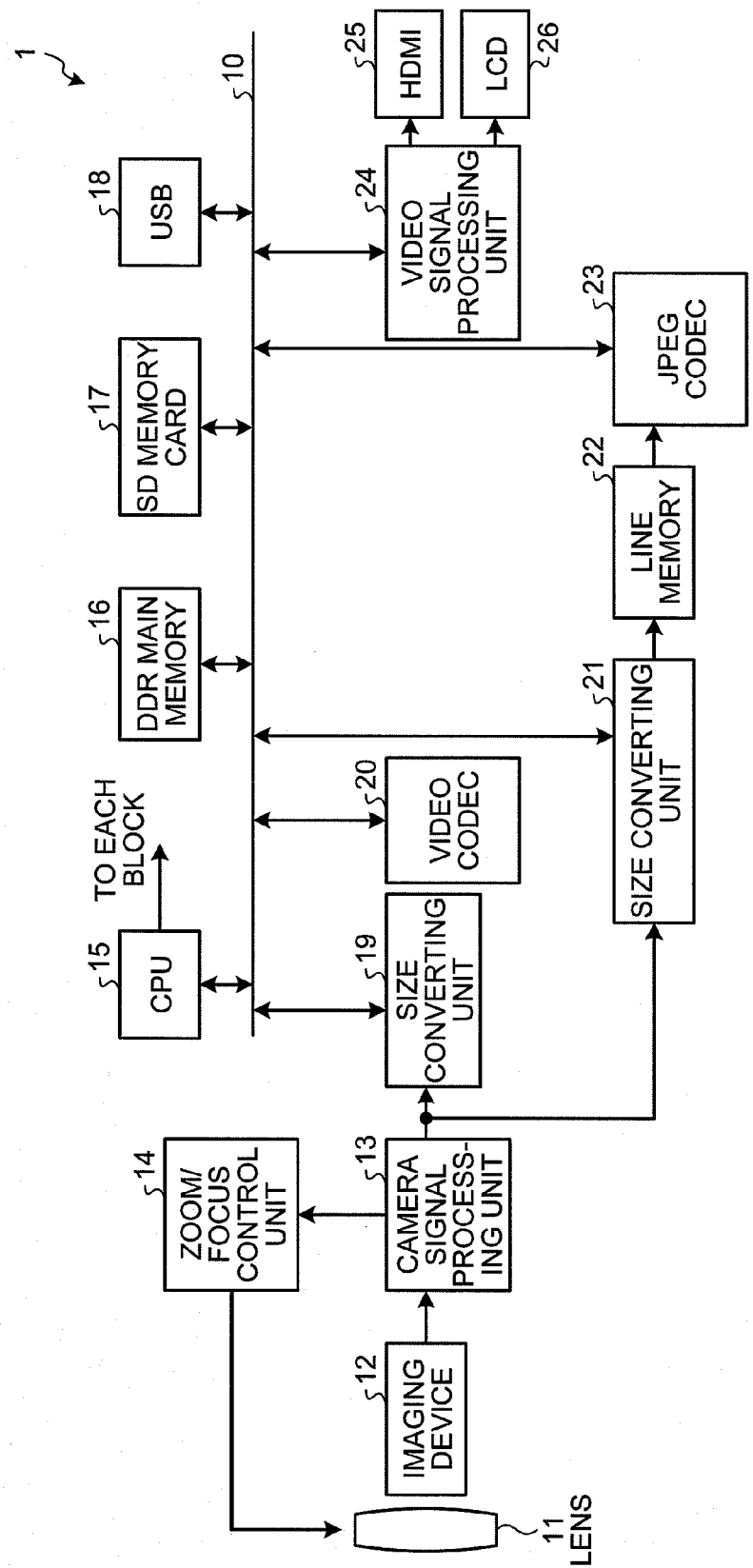
FIG. 1 is a block diagram that illustrates an image processing apparatus according to a first embodiment of the present invention.

FIG. 1 is a block diagram that illustrates an image capturing apparatus according to a first embodiment of the present invention. An image capturing apparatus 1 according to the first embodiment acquires a still image frame from motion picture data at arbitrary timing that is based on a user's instruction while acquiring motion picture data through an imaging device and performs an encoding (compressing) process of the still image frame in real time. Here, performing the encoding process in real time represents performing an encoding process of a still image frame at a frame rate that is the same as the input frame rate of the motion picture data (camera image), for example, a JPEG encoding process. Hereinafter, while the still image frame is described to be acquired at arbitrary timing that is based on a user's instruction, for example, it may be configured such that a "still image frame automatic acquisition mode" or the like is prepared, a specific target such as a smiling face of a subject is automatically detected, and a still image frame is automatically acquired in accordance with the detection result.

In order to realize the above-described operation, the image capturing apparatus 1 includes a lens 11 and an imaging unit that is configured by an imaging device 12 or the like generating image data by performing photoelectric conversion of incident light incident through the lens 11. In addition, the image capturing apparatus 1 includes a double-data-rate (DDR) main memory 16, a video codec 20, a line memory 22, and a JPEG codec 23. The DDR main memory 16, the video codec 20, the line memory 22, and the JPEG codec 23 are interconnected through a bus 10.

In the DDR main memory 16, motion picture data acquired by the imaging device 12 is written. The video codec 20 serves as a motion picture compressing unit performing a process of compressing motion picture data written in the main memory. In addition, the video codec 20 serves also as a motion picture decompressing unit decompressing the compressed motion picture data. The motion picture data acquired from the imaging device 12 is, first, written into the DDR main memory 16 and thereafter is encoded by the video codec 20.

Regarding a still image, a still image frame is acquired at arbitrary timing from the motion picture data acquired by the imaging device 12 by a still image frame acquiring unit (not illustrated in the figure), and still image data that is a part of the still image frame is stored in the line memory 22. For example, in a case where all the 60 frames of the motion picture data that is configured by 60 frames per second are acquired as the still image data, the motion picture data supplied from a camera signal processing unit 13 may be sequentially stored in the line memory 22, and the still image frame acquiring unit is unnecessary. In addition, in a case where a still image frame is acquired at arbitrary timing in accordance with a user's instruction, the still image frame acquiring unit may be configured by a switch performing a switching operation such that still image data acquired from a predetermined number of still image frames based on the motion picture data can be input to the line memory 22 or the like, for example, based on timing when the user presses a shutter button, which is not illustrated in the figure, of the image capturing apparatus 1.

In addition, the JPEG codec 23 serves as a still image compressing unit compressing still image data stored in the line memory 22. The JPEG codec 23 serves also as a decompression unit decompressing compressed still image data. The JPEG codec 23 encodes the still image data in real time in parallel with writing motion picture data that is in the middle of being captured into the DDR main memory 16. At this time, in the DDR main memory 16, the motion picture data is written, and encoded data that is encoded by the JPEG codec 23 in real time is written.

In the image capturing apparatus 1 configured as above, the still image frame acquired based on the motion picture data is not written in the DDR main memory 16 but is directly encoded in real time and then is written in the DDR main memory 16. By encoding the still image frame (hereinafter, uncompressed image data may be also referred to as raw data) acquired based on a captured image and afterward writing the encoded still image frame into the DDR main memory 16 instead of directly writing the still image frame into the DDR main memory 16, the load of the DDR main memory 16 on the bus bandwidth of the bus 10 decreases. Accordingly, it is possible to perform a high-speed process of capturing the still image data having a multi-pixel image size at a speed of 60 frames per second or the like.

Hereinafter, the image capturing apparatus 1 according to the first embodiment will be described in more detail. The image capturing apparatus 1 further includes a camera signal processing unit 13 and a zoom/focus control unit 14 that controls a zoom magnification and a focal distance of a lens 11 under the control of the camera signal processing unit 13. In addition, the image capturing apparatus 1 includes a central processing unit (CPU) 15 controlling each block, an SD memory card 17, and a universal serial bus (USB) 18. Furthermore, the image capturing apparatus 1 includes size converting units 19 and 21, a video signal processing unit 24, a high-definition multimedia interface (HDMI) 25, a liquid crystal display (LCD) 26, and the like. The processing units are interconnected through the bus 10.

The camera signal processing unit 13 includes a synchronization signal generating unit, a Y/C processing unit, and the like, which are not illustrated in the figure. The synchronization signal generating unit generates a horizontal synchronization signal and a vertical synchronization signal, which are synchronized with an internal clock, in correspondence with the horizontal size and the vertical size of image data to be generated. The image data, which is supplied from the imaging unit, synchronized with the horizontal synchronization signal and the vertical synchronization signal is input to the camera signal processing unit 13. The Y/C processing unit performs a Y/C process sequentially for a plurality of pieces of image data generated by the imaging unit. The Y/C process is a process for separating and converting image data into luminance data (Y) and color data (C). In other words, the camera signal processing unit 13 outputs image data acquired by performing a series of camera signal processes such as color separation, white balance adjustment, and the Y/C process for the captured image data.

The size converting unit 19 converts the size of the motion picture data output from the camera signal processing unit 13. This motion picture data, once, is written into the DDR main memory 16.

At the time of recording, the video codec 20 encodes the motion picture data written into the DDR main memory 16 once as described above, for example, in a format compliant with the H.264/AVC standard or the MPEG2 standard. The encoded data after encoding is written into the DDR main memory 16 and is transmitted to an external memory such as the SD memory card 17 as necessary. In addition, at the time of reproducing, the video codec 20 decodes the encoded motion picture data read from an external memory such as the SD memory card 17 and written into the DDR main memory 16.

The size converting unit 21, as described above, converts the size of the still image frame acquired by the still image frame acquiring unit (not illustrated in the figure). The size converting units 19 and 21 may be provided as necessary.

The SD memory card 17 is an external storage medium having a large capacity, the motion picture data or the still image data is written into the SD memory card 17, and such data can be displayed by an LCD 26 or the like. The image data stored in the SD memory card 17, once, is written into the DDR main memory 16, is decoded by the video codec 20, and can be output to the LCD 26 through the video signal processing unit 24 or be output through the HDMI 25. In addition, the image capturing apparatus 1 is connected to various peripheral devices through a USB 18.

The video signal processing unit 24 performs a series of video signal processing in which decoded image data is converted into output data having a form corresponding to the HDMI 25 or the LCD 26 and outputs an image through the LCD 26 or outputs the image data to an external monitoring device such as a television monitor or the like through the HDMI 25.

Normal Capturing Route and High-Speed Capturing Route

The image capturing apparatus 1 according to the first embodiment also has a route in which a still image frame is acquired from raw data or decoded motion picture data written in the DDR main memory 16, size conversion is performed by the size converting unit 21, and the still image frame is encoded using the JPEG codec 23 through the line memory 22 and is written into the DDR main memory 16.

In other words, the DDR main memory 16 writes motion picture data (first motion picture data) acquired by the imaging device 12 or motion picture data (second motion picture data) acquired by decoding motion picture data, of which encoding has been completed, read from the external memory such as the SD memory card 17. In such a case, also for the first motion picture data or the second motion picture data, a still image frame is acquired at arbitrary timing according to a user's instruction or the like and is output to the size converting unit 21. Then, the image size of the still image frame is converted by the size converting unit 21, and still image data that is a part of the still image frame is sequentially written into the line memory 22, the still image data written in the line memory 22 is encoded by the JPEG codec 23, and the encoded data, which has been encoded, is output to the DDR main memory 16. In addition, in a case where the still image frame is acquired from the raw data or the decoded motion picture data (first and second motion picture data) written in the DDR main memory 16, one still image frame may be acquired by composing not only one frame for the timing designated by the user but also a plurality of frames near the timing through the calculation of a weighted average thereof or the like.

Here, the DDR main memory 16 of the image capturing apparatus 1 according to the first embodiment preferably uses the line memory 22 on three sides in a case (hereinafter, also referred to as a high-speed capturing route) where JPEG encoding is performed without passing through the DDR main memory 16 from the camera signal processing unit 13, and two sides out of the three sides of the line memory 22 may be used in a case (also referred to as a normal route) where JPEG encoding is performed through the DDR main memory 16. Hereinafter, the reason for employing the three-side configuration of the DDR main memory 16 according to the first embodiment will be described.

In the case of the normal route, the raw data is transmitted from the DDR main memory 16, and, in the case of the transmission of the raw data, a bottle neck of the transmission depends on the bus bandwidth of the bus 10 of the DDR main memory 16. Accordingly, in the case of the normal route, a two-side configuration can be implemented when the bus bandwidth is secured by raising a priority level of the use of the bus bandwidth as will be described later or the like.

One of bottle necks for the high-speed capturing route of the image capturing apparatus 1 according to the first embodiment depends on the encoding processing capability of the JPEG codec 23. In the JPEG codec 23, although the magnitude relation of "amount of input data>amount of encoded data" is normally satisfied, the amount of encoded data becomes large due to allocation of Huffman coding or the like depending on the complexity of the image, and the above-described inequality may be reversed. In such a case, the process of reading image data may be momentarily delayed, and accordingly, there is a possibility that the process may fail when only the two sides of the line memory 22 are used, whereby it is necessary to form the line memory 22 to have a three-side configuration. In other words, in the JPEG codec 23, when the state of "input transmission rate<output transmission rate" is constantly formed, the process can be performed by employing only the two-side configuration. However, there is a case where a state of "input transmission rate>output transmission rate" momentarily occurs, and, in such a case, by employing the three-side configuration of the DDR main memory 16, even when the process of reading image data is delayed, it can be absorbed.

In the first embodiment, in a case where a still image is simultaneously acquired at the time of capturing a motion picture, the still image data supplied from the camera signal processing unit 13 is directly encoded and is written into the DDR main memory 16 through the high-speed capturing route, and accordingly, the amount of data can be smaller than that of a case where raw data is written as a conventional case. Thus, the bus bandwidth of the bus 10 of the DDR main memory 16 can be secured, and the encoded still image data such as 60 still image frames acquired per second can be written into the DDR main memory 16.

In addition, it is preferable that the line memory 22 includes three or more sides of the line memories each configured by n (here, n is an integer that is one or more) lines. By arranging three sides of the line memory, a part of the line memory can serve as a buffer absorbing variations in the processing rate at the time of performing a real-time encoding process and serve as a buffer adjusting the timing when the encoded data after the encoding process is written into the DDR main memory 16.

Real-Time Recording Process of Still Image Frame

Here, the image capturing apparatus 1 according to the first embodiment is an apparatus capable of performing a process (hereinafter, a process of encoding a still image frame in the high-speed capturing route may be also referred to as a real-time recording process, and each processing unit performing the process of encoding a still image frame in real time will be collectively referred to as a still image real-time processing unit) of encoding and recording a still image frame in real time at a high speed in parallel with recording a motion picture, as described above. Next, the real-time recording process of a still image frame will be described in detail.

1. Basic Configuration of Still Image Real-Time Processing Unit

Figure 2:
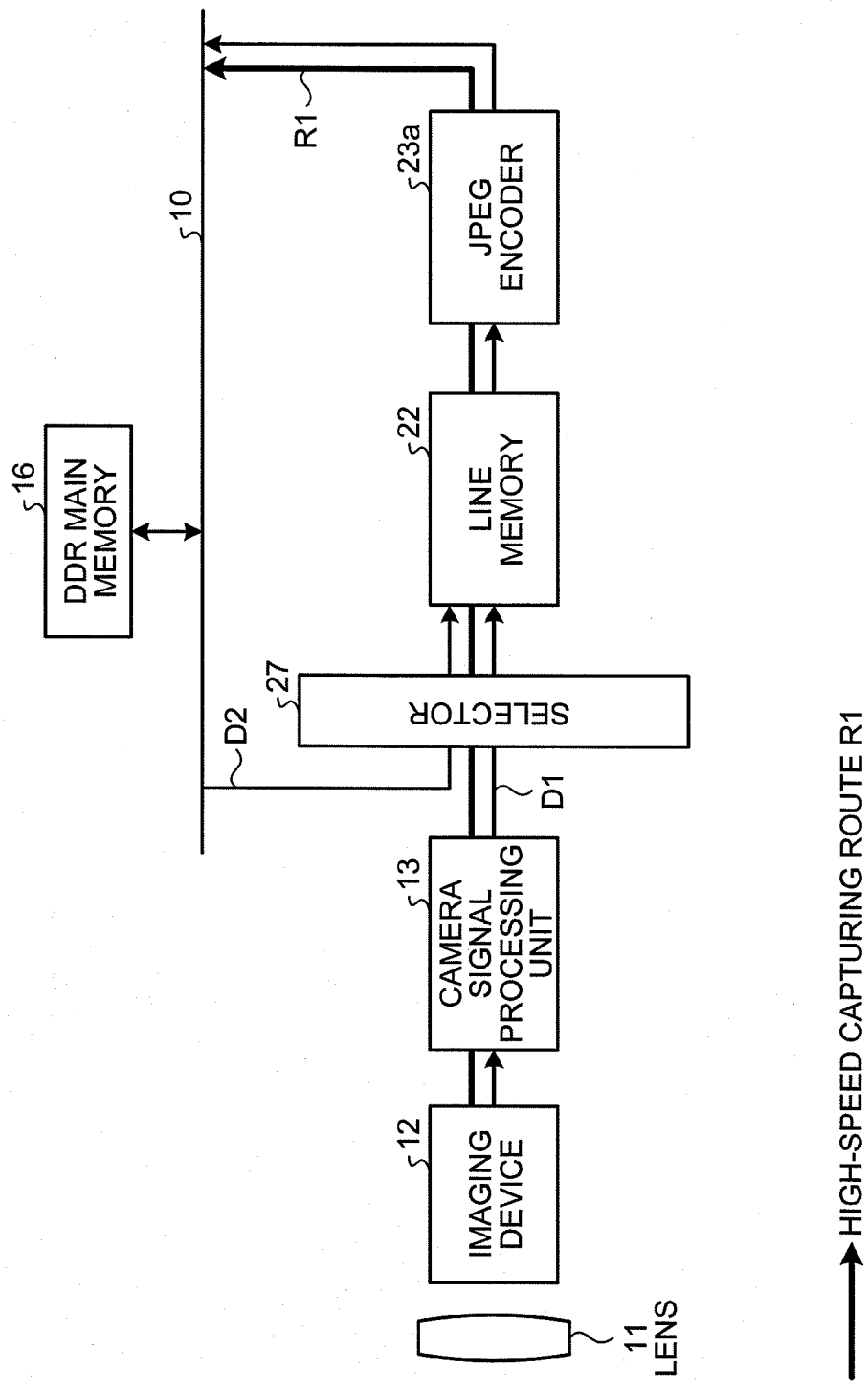
FIG. 2 is a diagram that illustrates a basic configuration realizing a real time recording process of a still image frame according to the first embodiment of the present invention.

FIG. 2 is a diagram that illustrates a basic configuration realizing the real time recording process of a still image frame. In FIG. 2 and FIGS. 3 to 16 to be described later, the same reference numeral is assigned to the same constituent element as that of the image capturing apparatus 1 illustrated in FIG. 1, and detailed description thereof will be omitted. In FIGS. 2 to 6, parts of the image capturing apparatus 1 are extracted to be represented for describing the real-time recording process of a still image frame.

As illustrated in FIG. 2, the still image real-time processing unit includes a selector 27 which switches between a path (high-speed capturing route R1) in which the real-time recording process is performed for a still image frame D1 input together with a motion picture in real time and a path (normal route) in which raw data or a still image frame D2 acquired from decoded motion picture data written in the DDR main memory 16 is encoded.

In the high-speed capturing route R1, in a case where a still image frame acquired from motion picture data that is acquired from the imaging device 12 is encoded in real time, the still image frame D1 is selected through the selector 27, and the selected still image frame is sequentially input to the line memory 22. The line memory 22 writes data less than still image data corresponding to one frame. The line memory 22 will be described in detail later. A JPEG encoder 23a that is arranged in the latter part of the line memory 22 encodes the still image data output from the line memory 22 in the JPEG format and outputs the encoded still image data. This encoded data is written into the DDR main memory 16.

On the other hand, in the case of the normal route, the motion picture data of the raw data written in the DDR main memory 16 is used. As this motion picture data, there is motion picture data that is acquired, for example, through the lens 11 and the imaging device 12 and is written into the DDR main memory 16. Alternatively, as the motion picture data, there is encoded motion picture data that is input from the external memory such as the SD memory card 17, is written into the DDR main memory 16 once, is decoded by the video codec 20 illustrated in FIG. 1, and is rewritten into the DDR main memory 16. In any case, the motion picture data is non-compressed motion picture data that is raw data or in the decoding-completed state.

Also for such motion picture data, a still image frame is acquired at arbitrary timing that is based on a user's instruction and is output to the size converting unit 21. A route in which image data read from this DDR main memory 16 passes through the size converting unit 21 and the line memory 22 and is encoded by the JPEG codec 23 is the normal route. The encoded still image data encoded by the JPEG codec 23 is written into the DDR main memory 16.

2. First Modified Example of Still Image Real-Time Processing Unit

Figure 3:
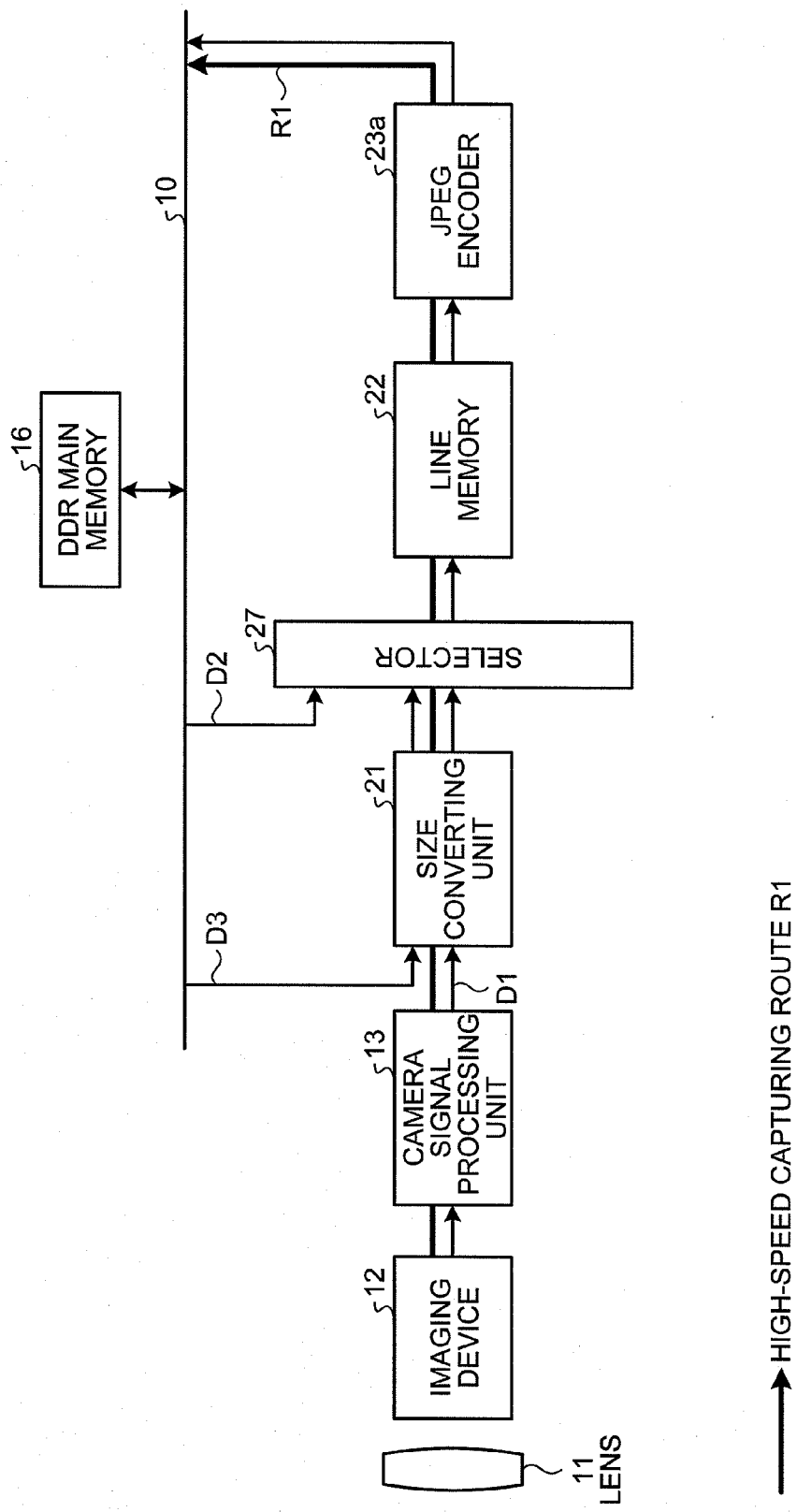
FIG. 3 is a block diagram that illustrates a first modified example realizing a real time recording process of a still image frame according to the first embodiment of the present invention.
Figure 4:
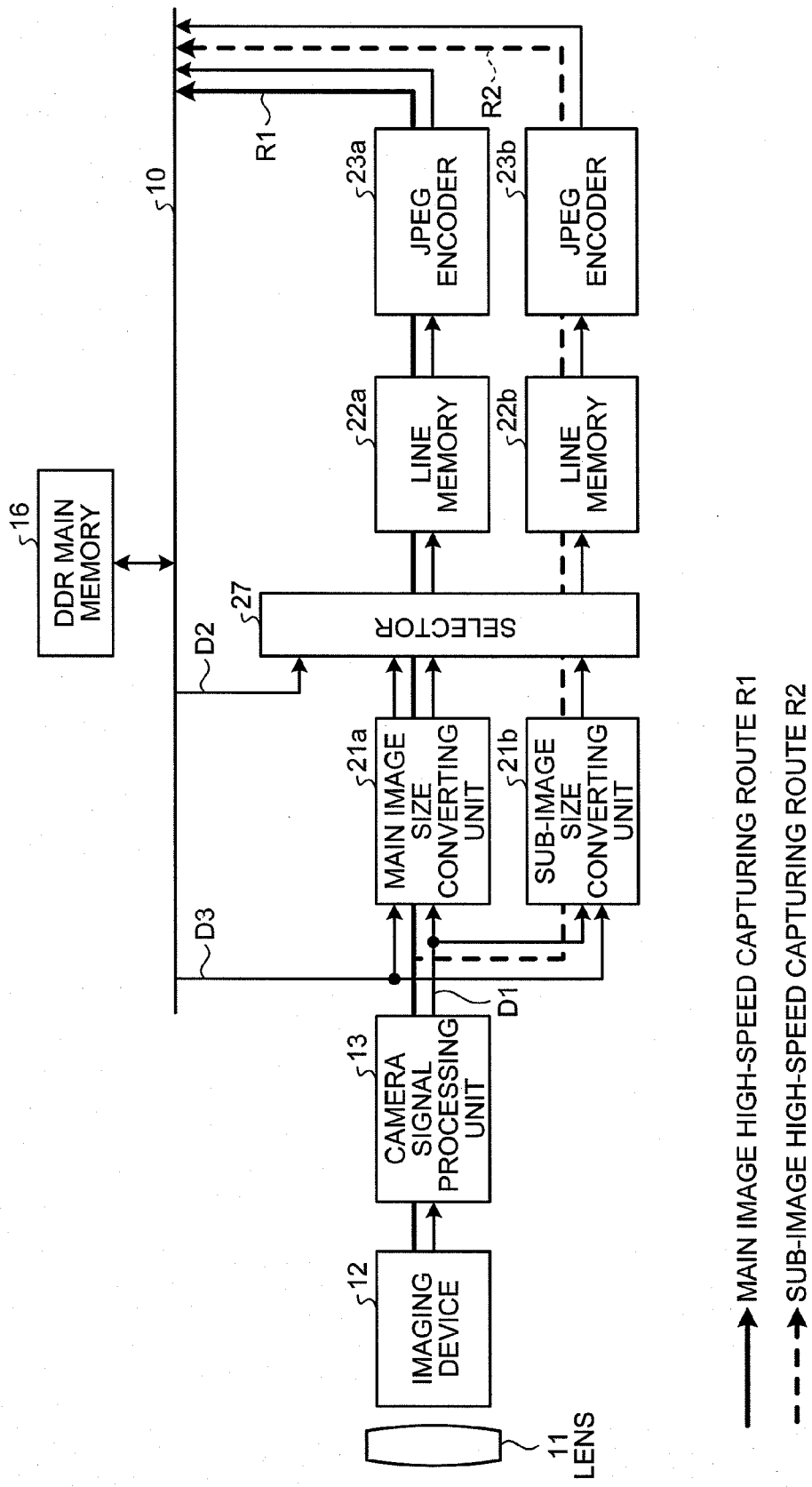
FIG. 4 is a block diagram that illustrates a second modified example realizing a real time recording process of a still image frame according to the first embodiment of the present invention.
Figure 5:
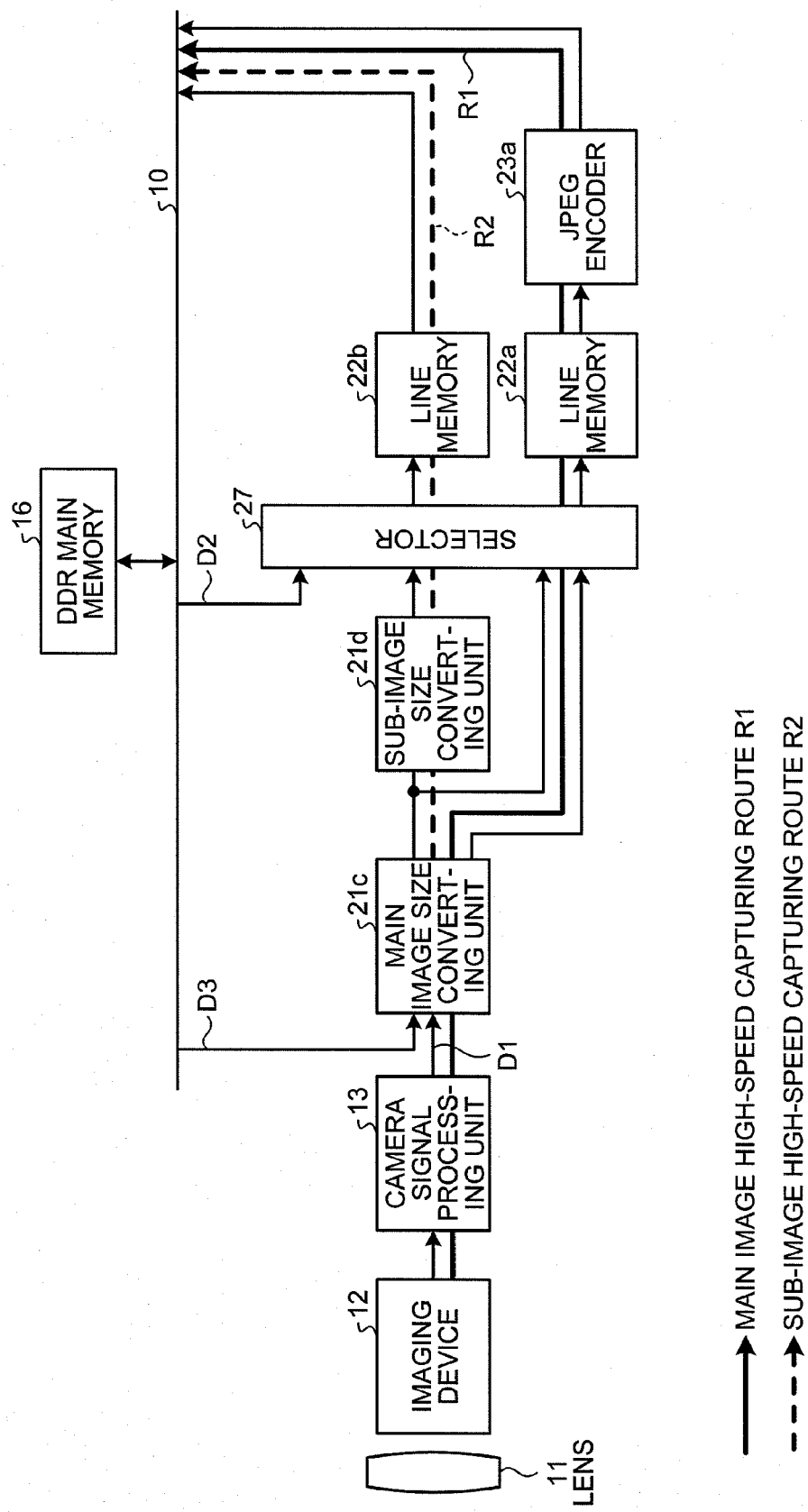
FIG. 5 is a block diagram that illustrates a third modified example realizing a real time recording process of a still image frame according to the first embodiment of the present invention.

Next, modified examples of the basic configuration illustrated in FIG. 2 will be described. FIGS. 3 to 5 are block diagrams that illustrate first to third modified examples. First, in the example illustrated in FIG. 3 that is the first modified example, the size converting unit 21 is arranged in the latter part of the camera signal processing unit 13 and is in the former part of the selector 27. In this modified example, by converting the size of the still image frame using the size converting unit 21 in the high-speed capturing route R1, the amount of data after encoding can be reduced. In addition, the user can configure the acquired still image data to be data of a desired size. In this modified example, for the normal path, there are two paths including: a path in which a still image frame D2 is acquired from the DDR main memory 16, is input to the line memory 22 through the selector 27, and is encoded by the JPEG encoder 23a; and another path in which a still image frame D3 is acquired from the DDR main memory 16, has the size converted by the size converting unit 21, then is input to the line memory 22 through the selector 27, and is encoded by the JPEG encoder 23a. In other words, the user can select whether to change the size.

3. Second Modified Example of Still Image Real-Time Processing Unit

Next, in the example illustrated in FIG. 4 that is the second modified example, a main image size converting unit 21a and a sub-image size converting unit 21b are included which generate main image data and sub-image data by converting the size of the still image frame acquired from the motion picture data input through the camera signal processing unit 13 in real time.

In addition, line memories 22a and 22b and JPEG encoders 23a and 23b are disposed in correspondence with the main image size converting unit 21a and the sub-image size converting unit 21b. The operation of each one of the line memories 22a and 22b is the same as that of the line memory 22, and the operation of the JPEG encoder 23b is the same as that of the JPEG encoder 23a.

Then, the selector 27 selects any one of: the still image frame D1 acquired from the motion picture data supplied from the camera signal processing unit 13 of which the size is converted into the main image size by the main image size converting unit 21a; the still image frame D1 of which the size is converted into the sub-image size by the sub-image size converting unit 21b; a still image frame D2 acquired from the raw data or the decoded motion picture data written into the DDR main memory 16; and still image data acquired by converting the size of still image frame D3 acquired from the raw data or the decoded motion picture data written in the DDR main memory 16 using the main image size converting unit 21a or the sub-image size converting unit 21b, and outputs the selected data to the line memory 22a or the line memory 22b.

In the second modified example, a real-time encoding process of the still image data having the main image size can be performed by the main image size converting unit 21a, the line memory 22a, and the JPEG encoder 23a. The route in which the real-time encoding process is performed, and the encoded data is written into the DDR main memory 16 is set as the main image high-speed capturing route R1. The main image high-speed capturing route corresponds to the high-speed capturing route illustrated in FIG. 3.

The real-time encoding process of still image data having the sub-image size such as a thumbnail can be performed by the sub-image size converting unit 21b, the line memory 22b, and the JPEG encoder 23b. The route in which the real-time encoding process is performed as above, and the encoded data is written into the DDR main memory 16 is set as a sub-image high-speed capturing route R2.

Also in the second modified example, a still image frame is acquired in real time through the main image high-speed capturing route R1 or the sub-image high-speed capturing route R2, is converted into still image compressed data, and is written into the DDR main memory 16. Generally, when JPEG encoding is performed, a data amount becomes about ⅓ of the original image size although it depends on a quantization coefficient used at the time of the JPEG encoding. Accordingly, similarly to the first embodiment and the first modified example described above, the load of the DDR main memory 16 on the bus bandwidth of the bus 10 decreases, whereby high-speed still image capturing can be performed.

In addition, by decreasing the size of the image output from the imaging device 12 in real time, a JPEG file having any size desired by the user can be encoded in the same processing time as that of a case where the size is not decreased.

Furthermore, by performing a parallel process (reduction and transmission to the main memory) in real time for the sub-image (thumbnail) used as an index and the main image data, the EXIF packaging process can be performed at a higher speed.

In addition, for performing the parallel processing of the main image data and the thumbnail image data, line memories required for the reduction process can be shared for the main image data and the thumbnail data depending on the circuit configuration.

4. Third Modified Example of Still Image Real-Time Processing Unit

Next, as described above, an example will be described as a third modified example in which the resources of the main image size converting unit and the sub-image size converting unit are shared. As illustrated in FIG. 5 that is the third modified example, in this modified example, the main image high-speed capturing route R1 and the sub-image high-speed capturing route R2 share a main image size converting unit 21c. The main image size converting unit 21c converts the size of the main image. Accordingly, the output of the main image size converting unit 21c is input to the selector 27. The selector 27 selects any one of the still image data D1 supplied from the main image high-speed capturing route R1 and the still image frame D3 acquired from the raw data or the decoded motion picture data written in the DDR main memory 16 in accordance with the mode and outputs the selected data. The still image data selected and output by the selector 27 is input to the line memory 22a, then is input to the JPEG encoder 23a, is encoded, and is written into the DDR main memory 16.

In the third modified example, a sub-image size converting unit 21d that is connected to the main image size converting unit 21c in series is included. Usually, the main image size is larger than the sub-image size. Accordingly, a case where the still image frame of which the size has been converted first by the main image size converting unit 21c has the size converted by the sub-image size converting unit 21d has lower degree of size conversion than that of a case where the size of the still image frame D1 acquired from the motion picture data is converted. Accordingly, in this modified example, the still image frame is converted by the sub-image size converting unit 21d using a result of the main image size converting unit 21c. From this, the amount of calculation processing in the sub-image size converting unit 21d can be reduced.

In other words, in order to realize various reduction rates, the generation of a thumbnail has a small number of horizontal pixels but a high thinning-out reduction rate, and accordingly, the required number of lines of the line memory (scaler buffers 212a/b) used in a vertical filter circuit increases. Thus, by contriving a system configuration in which a pre-filter process is performed for the image data of a main image, and a filter process is performed for the data written into the line memory in which the frequency characteristic is additionally dropped for the image data of a thumbnail image, the resources of the line memory for the remaining thumbnail image data can be distributed to the other data.

In addition, in the third modified example, a JPEG codec is not included in the sub-image high-speed capturing route R2. The reason for this is that the sub-image data has a size smaller than the main image data, and the data capacity is not large by that amount. Accordingly, the sub-image data may be written into the DDR main memory 16 as non-compressed data without performing an encoding process for the sub-image data in real time.

5. Fourth Modified Example of Still Image Real-Time Processing Unit

Figure 6:
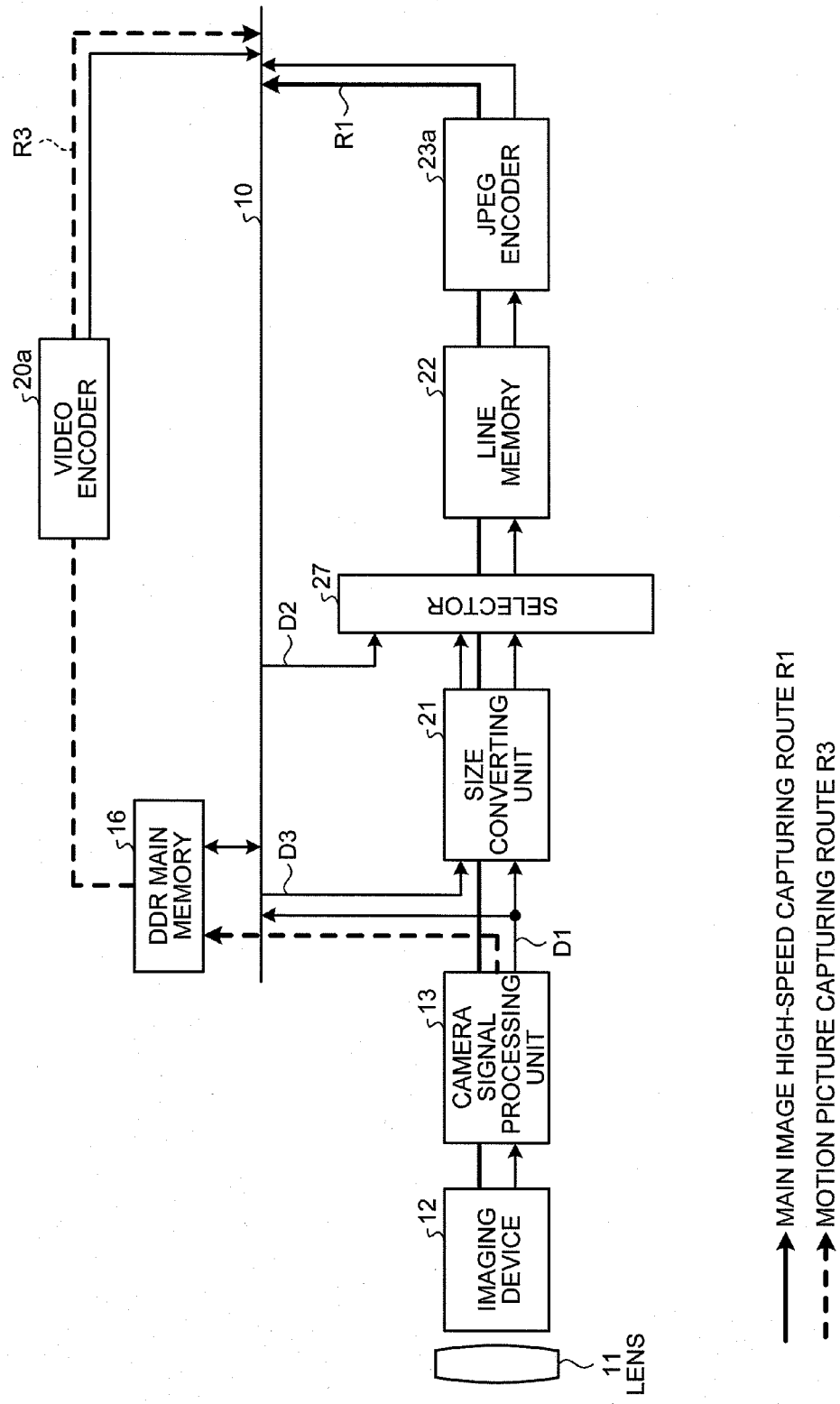
FIG. 6 is a block diagram that illustrates a fourth modified example realizing a real time recording process of a still image frame according to the first embodiment of the present invention.

Next, FIG. 6 illustrates a fourth modified example of the basic configuration illustrated in FIG. 2 together with motion picture capturing route R3. When compared to the image capturing apparatus 1 illustrated in FIG. 1, the image capturing apparatus does not include the size converting unit 19 differently from the image capturing apparatus 1. Other configurations are the same as those of the image capturing apparatus 1 illustrated in FIG. 1. In the motion picture capturing route R3, motion picture data supplied from the camera signal processing unit 13, once, is written into the DDR main memory 16. Thereafter, the motion picture data is formed, for example, as encoded data that is compliant with H.264/AVC standard or the MPEG2 standard by a video encoder 20a and is written back into the DDR main memory 16.

Details of the First Embodiment of Present Invention

Figure 7:
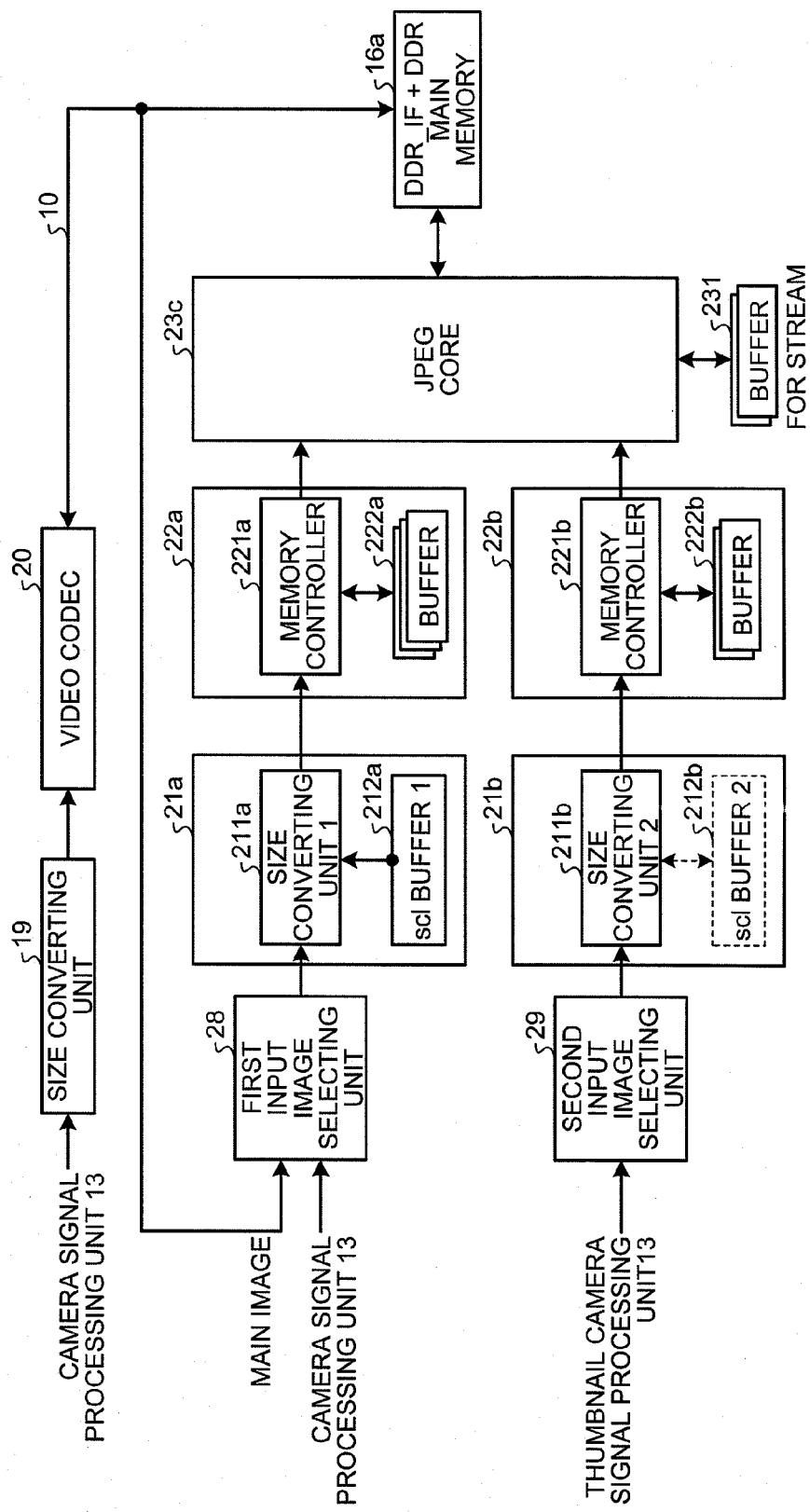
FIG. 7 is a block diagram that illustrates the image processing apparatus according to the first embodiment of the present invention in detail.

Next, the first embodiment will be described in further more detail. FIG. 7 is a block diagram that illustrates blocks relating to the high-speed capturing route and the motion picture capturing route between the camera signal processing unit 13 and the DDR main memory 16. In this example, the image capturing apparatus 1 has two paths for encoding a still image frame, which is acquired from the motion picture data, output from the camera signal processing unit 13. One is a path (hereinafter referred to as Path 1) relating to still image data that becomes a main image, and the other is a path (hereinafter, referred to as Path 2) relating to still image data the becomes a sub-image (thumbnail).

Path 1 includes a first input image selecting unit 28, a main image size converting unit 21a, and a line memory 22a, and still image data supplied from the line memory 22a is input to a JPEG core 23c and is encoded in real time.

Path 2 includes a second input image selecting unit 29, a sub-image size converting unit 21b, and a line memory 22b, and still image data supplied from the line memory 22b is input to a JPEG core 23c and is encoded in real time. The still image data for Path 2 does not need to be encoded in real time but may be configured to be written, once, into a DDR main memory 16a.

Here, the main image size converting unit 21a includes a size converting unit 211a and a scaler buffer 212a; and the sub-image size converting unit 21b includes a size converting unit 211b and a scaler buffer 212b. The scaler buffers 212a and 212b are line memories. The main image size converting unit 21a and the sub-image size converting unit 21b, basically, convert the size of still image data input from the camera signal processing unit 13 into sizes for a main image and a thumbnail. The main image size converting unit 21a and the sub-image size converting unit 21b will be described later in detail.

The line memory 22a includes a memory controller 221a and a buffer 222a that is configured by an SRAM or the like; and the line memory 22b includes a memory controller 221b and a buffer 222b. The buffers 222a and 222b are buffers configured by three sides and two sides. For example, a buffer 231 having the two-side configuration is connected also to the JPEG core 23c.

The buffers 222a and 222b, for example, are configured by SRAMs, and the functions thereof will be described later. In order to cause the SRAMs to serve as line memories, the memory controllers 221a and 221b control data accesses to the buffers 222a and 222b. In addition, in a case where the clock frequencies of the main image size converting unit 21a, the sub-image size converting unit 21b, and the JPEG core 23c are different from each other, a process of converting the clock frequencies and the like may be performed.

The JPEG core 23c includes a JPEG codec and an interface. In the case of no encoding, the JPEG core 23c transmits main image YUV data for a main image and thumbnail YUV data for a thumbnail image to the DDR main memory 16a. On the other hand, in a case where there is encoding, the JPEG core 23c encodes main image data and transmits a stream to the DDR main memory 16a. In addition, for the thumbnail image, the JPEG core 23c encodes thumbnail image data and transmits a stream to the DDR main memory 16a. Here, the DDR main memory 16a of this example also includes the DDR interface.

The first input image selecting unit 28 and the second input image selecting unit 29 have the function of the selector 27 illustrated in FIGS. 2 to 6 for selecting input image data supplied from a plurality of routes. Basically, when a motion picture is captured, usually, a still image frame acquired from raw motion picture supplied from the DDR main memory 16a or a still image frame acquired from decoded motion picture data is selected. On the other hand, when a still image is captured during the capturing of a motion picture, a still image supplied from the high-speed capturing route is selected. In addition, when a motion picture is reproduced, a motion picture reproduction route, in other words, an input still image acquired from the raw motion picture data or the decoded motion picture data written into the DDR main memory 16a is selected.

In the main image size converting unit 21a and the sub-image size converting unit 21b, still image frames acquired from the motion picture data supplied from the camera signal processing unit 13 or the motion picture data supplied from the DDR main memory 16a are converted to have the sizes of a main image and a thumbnail image, respectively.

The still image frames for which size conversions in the horizontal direction and the vertical direction have been performed are stored in the buffers 222a and 222b controlled by the memory controllers 221a and 221b, respectively. The buffers 222a and 222b configuring the line memories 22a and 22b are buffers corresponding to 8 lines for storing pixels that are necessary for a 8×8 DCT and have the configurations of Y8 lines×3 sides+C8 lines×3 sides (in the case of a 4:2:2 format) and Y16 lines×3 sides+C8 lines×3 sides (in the case of a 4:2:0 image format). Here, the number of sides is at the time of configuring a single port. The reason for configuring three sides is that, as will be described later, the process reduction is absorbed in a case where the processing load temporarily increases due to the real time processing of the JPEG encoding process in preparation for the latter part and the processing rate decreases, and a delay is absorbed in a case where the process of writing data into the DDR main memory 16a disposed in the latter part thereof is delayed. In addition, the two-side configuration may be employed depending on the system configuration.

By the JPEG core 23c:
YUV transmission in a case where there is no encoding of a main image;
an encoding process in a case where there is encoding of a main image+stream transmission;
YUV transmission in a case where there is no encoding of a thumbnail;
an encoding process in a case where there is encoding of a thumbnail+stream transmission, and the like are performed. In addition, when a main image is encoded, a stream buffer 231 is used before the transmission of the DDR main memory 16a.

The buffer 231 may have a SRAM two-side configuration or the like. In addition, the capacity thereof may vary in accordance with the system configuration and is preferably configured to be able to absorb a delay in a case where a write process for writing transmission data into the DDR main memory 16a is delayed.

Process of Size Converting Unit

Figure 8:
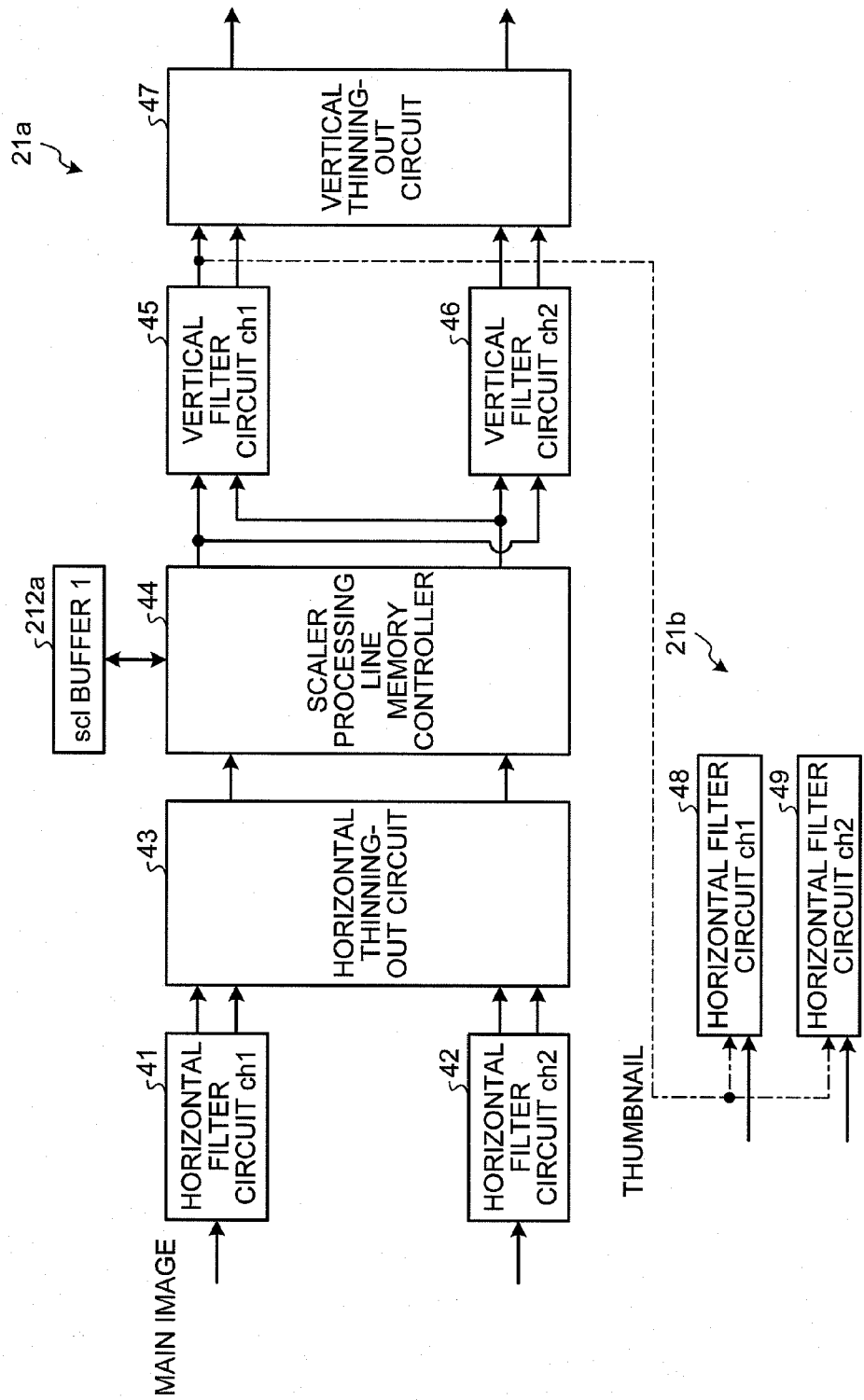
FIG. 8 is a block diagram that illustrates a size converting unit of the image processing apparatus according to the first embodiment of the present invention in detail.

Next, the size converting unit 21 will be described in detail. FIG. 8 is a block diagram that illustrates the size converting unit 21 in detail. Two channels are configured in correspondence with acquired still image data. From this, even when data is simultaneously input to two lines (in the case of the progressive type ODD (an odd number) and EVEN (an even number)), the data can be processed. By configuring simultaneous two channels, the process clock rate of the camera processing can be lowered.

An input image is limited to have frequency characteristics that are necessary to a horizontal filter circuit (ch1) 41 and a horizontal filter circuit (ch2) 42. For example, in a case where horizontal 1024 pixels and vertical 768 lines are thinned out to 512 pixels×384 lines with a sampling frequency fs, filtering is performed with the cutoff-frequency of the filter being set to fs/4. Then, thinning-out is performed to be 512 pixels using a horizontal thinning-out circuit 43, and the data is written into the scaler buffer 212a. When thinning-out is performed without limiting the frequency characteristics of the horizontal filter circuits 41 and 42, a so-called moire (folding distortion) occurs.

A scaler process line memory controller 44 performs scaler adjustment of image data that is thinned out by the thinning-out circuit 43. More specifically, for data after thinning-out, in a case where a sample point is located between sampling points, values of a second and subsequent samples of image signals which have been processed to be filtered are calculated in accordance with distances of the samples after interpolation, and linear interpolations between pixels and the like are performed.

The still image frames after the horizontal interpolations are output to vertical filter circuits 45 and 46. Similarly to the horizontal direction, in order to suppress the occurrence of folding distortion, the still image data read out from the line memory (the scaler buffer 212a) by the vertical filter circuits 45 and 46 is processed to be filtered in the vertical direction. After the filtering, vertical thinning-out is performed by a vertical thinning-out circuit 47, and only necessary image data is written into the buffers 222a and 222b through the memory controllers 221a and 221b arranged in the latter part thereof.

Here, the size conversions can be independently performed for a main image and a thumbnail image as parallel processes. In addition, the buffer size may be reduced by sharing the scaler buffer 212a. For example, a case will be considered in which still image data for a main image is set to have fs/4 through a frequency characteristic reducing process performed by the horizontal filter circuits 41 and 42. In the filtering processes performed in horizontal filter circuits 48 and 49 used for thumbnails that are connected to the latter part thereof in series, horizontal 160 pixels×vertical 120 lines are formed. Accordingly, a process of fs/12.8 is necessary only for the size converting unit 211a (independently used) and the size converting units 211a and 211b and scaler 1+scaler 2 (connected to the latter part in series): a process of fs/6.4 (since fs/2→fs/4 in the former part) are configured, and, in the case of the serial connection to the latter part, the limit width of the frequency characteristics may be small. In a case where the limit width is small, the limit efficiency of the bandwidth is high for the same dimension, whereby the image quality is improved. On the other hand, in a case where an image quality of the same degree is sufficient, the dimension can be reduced. As a result, the necessary line memory of the scaler buffer 212b is reduced, and accordingly, the remaining line memory can be distributed to the other resources.

The size converting unit for a thumbnail uses signals between the vertical filter circuits 45 and 46 and the vertical thinning-out circuit 47. In other words, the size of the still image data after the size conversion performed by the size converting unit used for a main image is converted. Similarly, the size converting unit used for a thumbnail includes horizontal filter circuits 48 and 49, a thinning-out circuit, a scaler process line memory controller, a vertical filter circuit, and a vertical thinning-out circuit and outputs a still image of which the size is converted by a similar process.

The still image data written into the buffers 222a and 222b are transmitted to the DDR main memory 16a, for example, every time when eight-line data is written. While the processes performed on the side of the DDR main memory 16a vary in correspondence with the system, usually however, a still image route, a motion picture route, and a calculation result used for a camera control signal, and the like are written into the DDR main memory 16a. Accordingly, it is configured such that a bandwidth capable of processing a rate that is equal to or higher than the data rate of the real-time recording process of a still image frame is secured. However, there may be a moment at which the bus bandwidth of the bus 10 is occupied with data other than that of the real-time recording process of a still image frame. Accordingly, in order to absorb a process delay of the DDR main memory 16a, the image capturing apparatus includes the scaler buffers 212a and 212b, the buffers 222a and 222b, the stream buffer 231, and the like.

Line Memory Having Three-side Configuration

Figure 9:
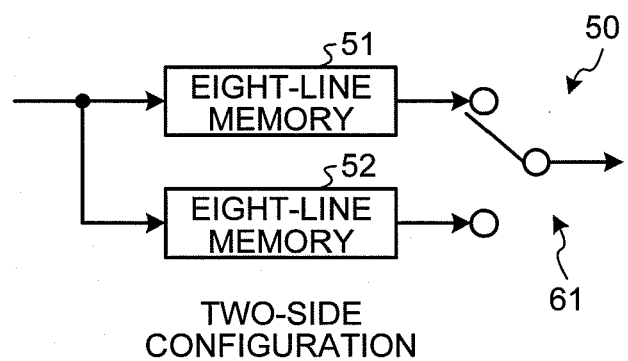
FIG. 9 is a diagram that illustrates an example of a two-side configuration of eight-line memories.
Figure 10:
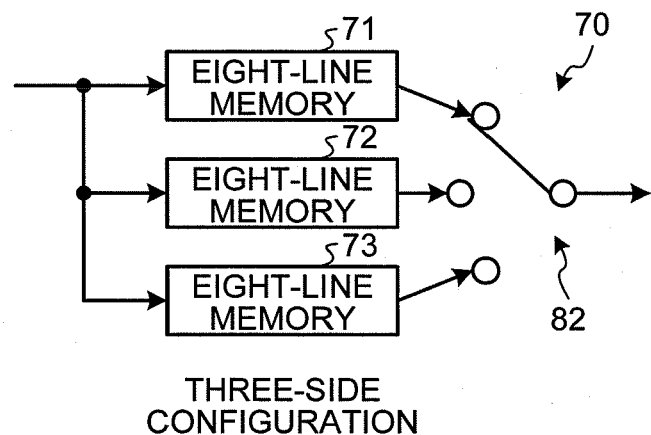
FIG. 10 is a diagram that illustrates an example of a three-side configuration of eight-line memories.

Next, the reason why the three-side configuration of the line memory 22 is preferable will be described. FIG. 9 is a diagram that illustrates an example of the two-side configuration of eight-line memories, and FIG. 10 is a diagram that illustrates an example of the three-side configuration of eight-line memories. As illustrated in FIG. 9, in a line memory 50 having the two-side configuration, switching between eight-line memories 51 and 52 is made by a switch 61. In addition, as illustrated in FIG. 10, in a line memory 70 having the three-side configuration, switching among eight-line memories 71 to 73 is made by a switch 82.

Figure 11:
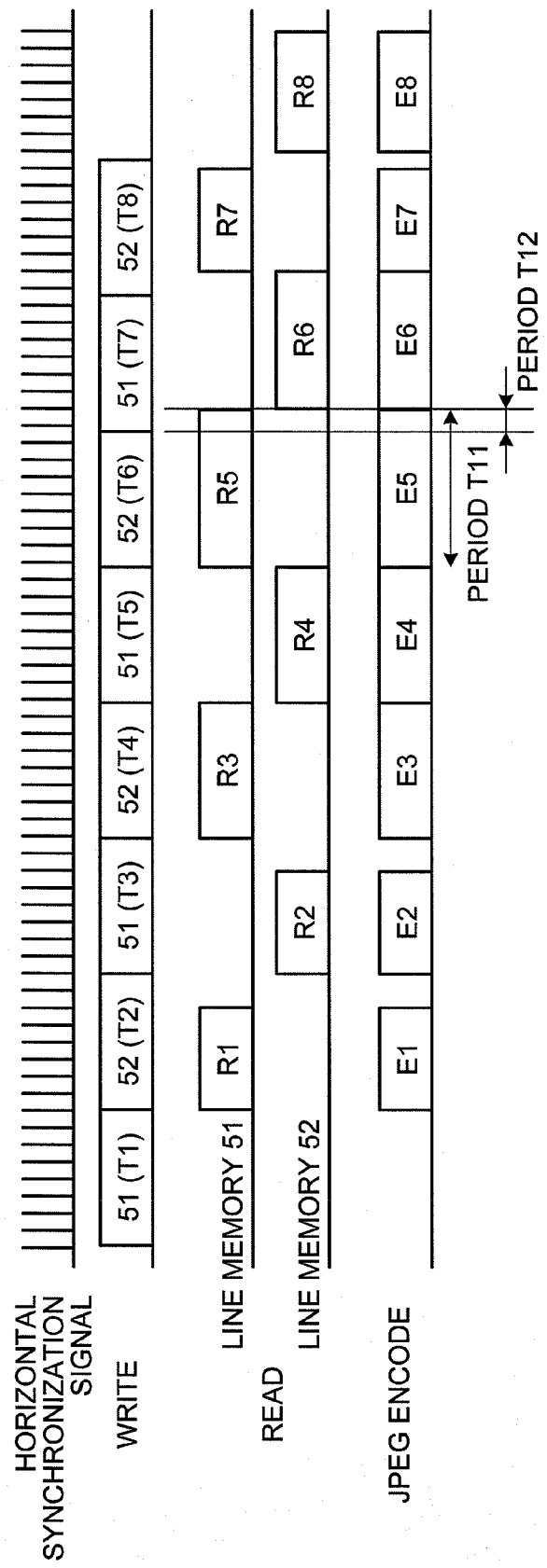
FIG. 11 is a timing chart that illustrates a write period, a read period, and a JPEG encoding period of a line memory having the two-side configuration.

FIG. 11 is a timing chart that illustrates a write period, a read period, and a JPEG encoding period of the line memory 50. The writing data into the line memory 50 is continuously performed for eight horizontal synchronization periods (T1 to T8), and the timing when data is read from the line memory 50 is approximately the same as timing at which the JPEG encoder encodes data corresponding to 8 lines.

Regarding the encoding period of the JPEG encoder, the amount of calculation required for the process changes in accordance with input image data. In most cases, while the compression rate is one or less, and the encoding process is performed for a processing period of 8 lines or less, there are cases where the compression rate is one or more, and a processing period of 8 lines or more is required for a complex pattern.

In FIG. 11, it is assumed that a complex pattern is formed in a period T11. In such a case, a period in which the line memory 51 reads image data is longer than a length (T6) corresponding to 8 lines, and there is a period T12 in which a write period T7 of the line memory 51 overlaps the timing. During this period, since writing of new data into the line memory occurs on the line memory to be read, and accordingly, correct JPEG encoding cannot be performed.

Figure 12:
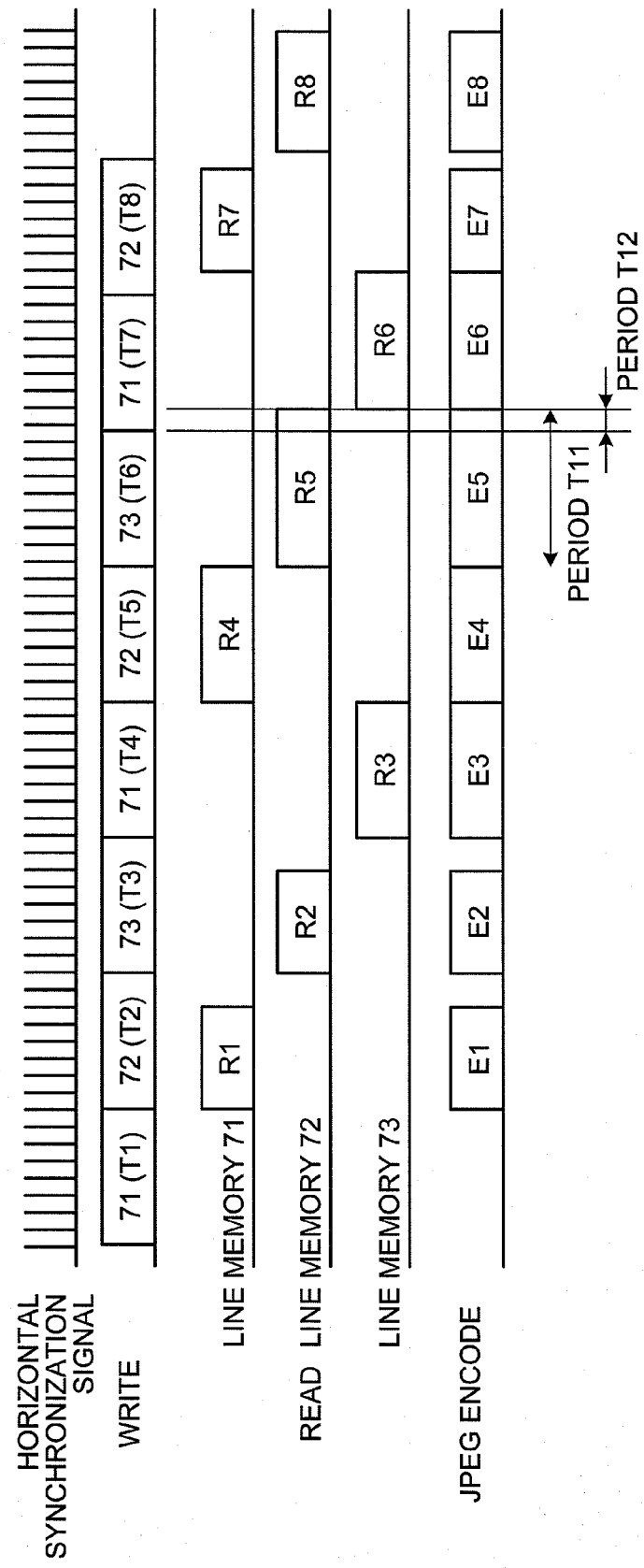
FIG. 12 is a timing chart that illustrates a write period, a read period, and a JPEG encoding period of a line memory having the three-side configuration.

FIG. 12 is a timing chart that illustrates a write period, a read period, and a JPEG encoding period of the line memory 70 having the three-side configuration. As illustrated in FIG. 12, even in the case of the period T11 in which the input image has a complex pattern, and the encoding period of the JPEG encoder is a processing period of 8 lines or more, a period R5 in which data is read from the line memory 72 is longer than 8 lines, a line memory in which data is written is the line memory 71 (T7), and accordingly, a period in which timings overlap for the same line memory does not occur, and correct JPEG encoding can be performed.

In other words, by employing the three-side configuration of the eight-line memories in the line memory 22, even in a case where the compression rate is near one, the timing does not need to be considered.

As above, a part of the line memory can serve as a buffer absorbing variations in the processing rate at the time of real-time processing of a still image frame. In addition, the line memory may serve as a buffer adjusting the timing at the time of writing compressed data after the compression process into the DDR main memory 16.

Arbitration Process of Bus 10

When data is output to the bus 10 of the DDR main memory 16a, the bus 10 is arbitrated, and a block permitted to output data to the bus 10 is determined in accordance with a priority level. The block is permitted to output data outputs the data to the DDR main memory 16a, and the other blocks not permitted to output data stop output until the output is permitted.

Figure 13:
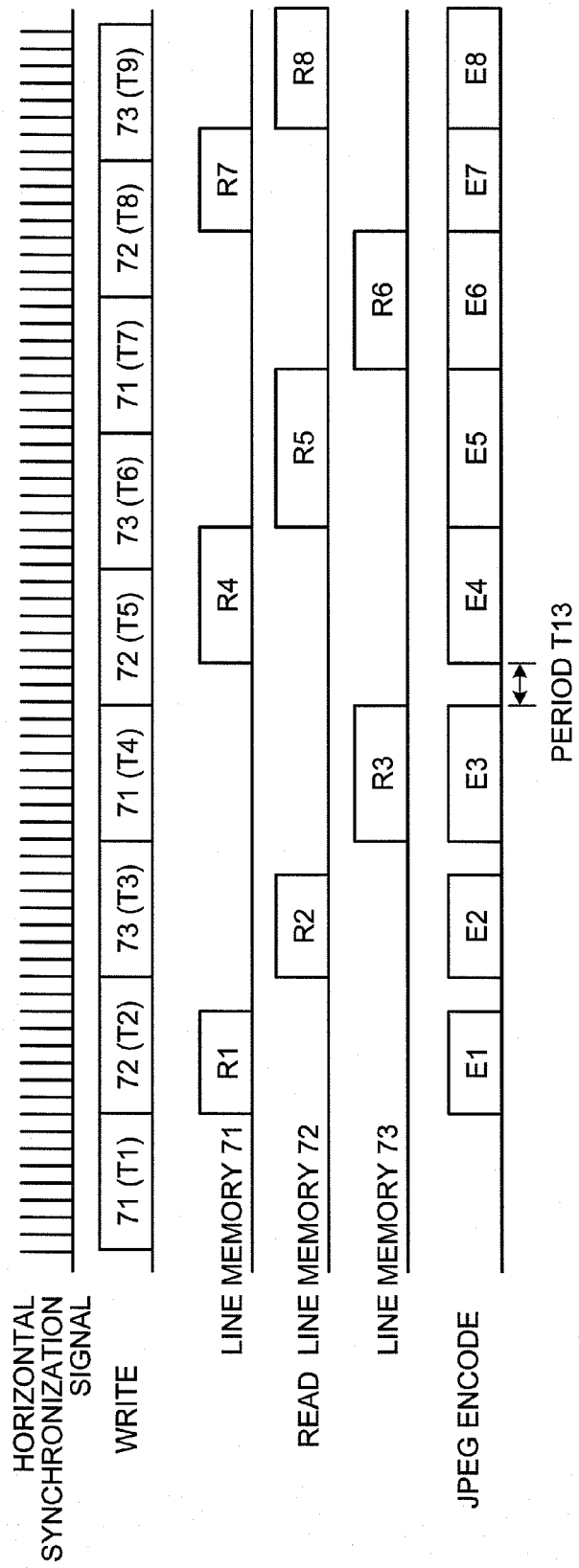
FIG. 13 is a timing chart that illustrates another example of a write period, a read period, and a JPEG encoding period of a line memory having the three-side configuration.

In other words, when the JPEG codec 23 outputs a JPEG encoded stream to the bus 10 of the DDR main memory 16a, in a case where the JPEG stream is not permitted to be output to the bus 10, the JPEG codec 23 performs an operation of stopping the output of the JPEG stream. FIG. 13 is a diagram that illustrates another example of a write period, a read period, and a JPEG encoding period of the line memory 70 having the three-side configuration. In FIG. 13, a period denoted by a period T13 represents a period during which another block is permitted to output data to the bus 10, and the JPEG codec 23 cannot output the JPEG stream to the bus 10.

The JPEG codec 23 accumulates a JPEG encoded stream in the buffer disposed in the output stage until the output is permitted. After the output is permitted, when the JPEG encoded stream is output to the bus 10 of the DDR main memory 16a, the operation can be performed without interrupting the JPEG stream.

In a case where output permission cannot be acquired over a period corresponding to the capacity of the buffer disposed at the output stage, the JPEG stream is interrupted, and accordingly, it is necessary to have sufficient room in the capacity of the buffer. Here, by using the eight-line memory of the line memory 22, the capacity of the output buffer of the DDR main memory 16 can be prevented from being insufficient.

In other words, the read timing of data from the eight-line memory of the line memory 22 is delayed (R4) until the output to the bus 10 of the DDR main memory 16a can be made, and the start of JPEG encoding is delayed, whereby the timing at which the JPEG stream is transmitted to the DDR main memory 16a can be delayed.

In FIG. 13, while a ratio occupied by the JPEG stream is represented to be large for the convenience of description, actually, such timing occurs in a state in which a size conversion output for a motion picture, a video codec, video processing, and the like are matched. As will be described in the second embodiment to be described later, the output stage of the DDR main memory 16a of each block for the bus 10 has a buffer so as to respond to the incapability of output to the bus. Then, as in this example, the eight-line memory of the line memory 22 that is disposed in the former part of the JPEG codec 23 may be configured to have a similar function as a buffer adjusting the output to the bus.

Operation of Capturing Still Image at Time of Reproducing Motion Picture Using Image Capturing Apparatus 1

Figure 14:
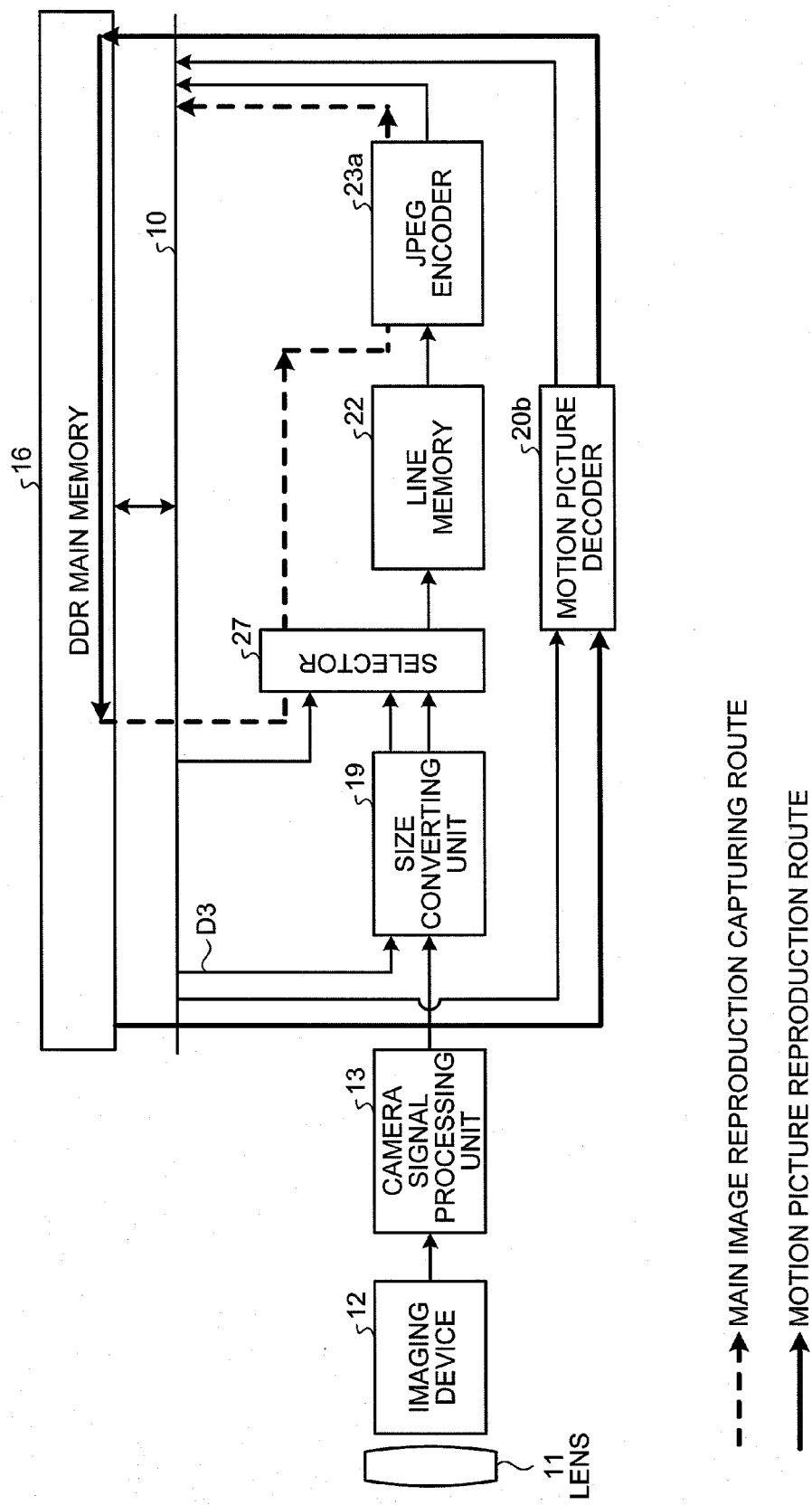
FIG. 14 is a diagram that illustrates the operation of the image processing apparatus according to the first embodiment of the present invention at the time of reproduction.

Next, operation of capturing a still image at the time of reproducing a motion picture will be described. This operation is similar to the operation of a conventional image capturing apparatus. FIG. 14 is a diagram that illustrates the operation of the image capturing apparatus at the time of reproduction. As illustrated in FIG. 14, at the time of reproducing a motion picture, encoded motion picture data, which has been encoded, written into the DDR main memory 16 is input to a motion picture decoder 20b, is decoded, and is written into the DDR main memory 16. The video signal processing unit 24 performs video signal processing of the decoded motion picture data, as described above, and the decoded motion picture data that has been processed is output to the LCD 26 or the HDMI 25.

In addition, by outputting the raw data or the decoded motion picture data written into the DDR main memory 16 so as to be displayed on the LCD 26, a user may press the shutter at arbitrary timing. In such a case, a still image frame according to the timing of the shutter is acquired, is input to the JPEG encoder 23a through the selector 27, is encoded, and is written into the DDR main memory 16. In addition, in a case where a still image frame is acquired from the motion picture data, one still image frame may be generated by averaging or weighted averaging two or more frames.

In the first embodiment, by directly encoding the still image frame acquired from the motion picture data in the middle of being captured in real time without writing the still image frame into the main memory, a minimal circuit scale, a minimal operating clock, and minimal power consumption according thereto are realized, and a high-speed capturing process of more frames even for a multi-pixel image size, for example, 60 frames per second can be realized. In addition, a still image acquiring process performed while a motion picture acquiring process is performed increases a system load. Accordingly, in order to realize such a process, the cost increases, the bus clock frequency increases so as to raise the difficulty level for generating an LSI, and disadvantages and limits such as an increase in the power consumption and a decrease in the motion picture processing rate occur. However, in the first embodiment, the efficiency of the still image processing can be improved, and a high-speed still image acquiring process can be performed without having an influence on the motion picture acquiring process. In other words, a still image can be captured at a high speed with high efficiency by employing a required minimum configuration even at the time of reproducing a motion picture.

Second Embodiment of Present Invention

Figure 15:
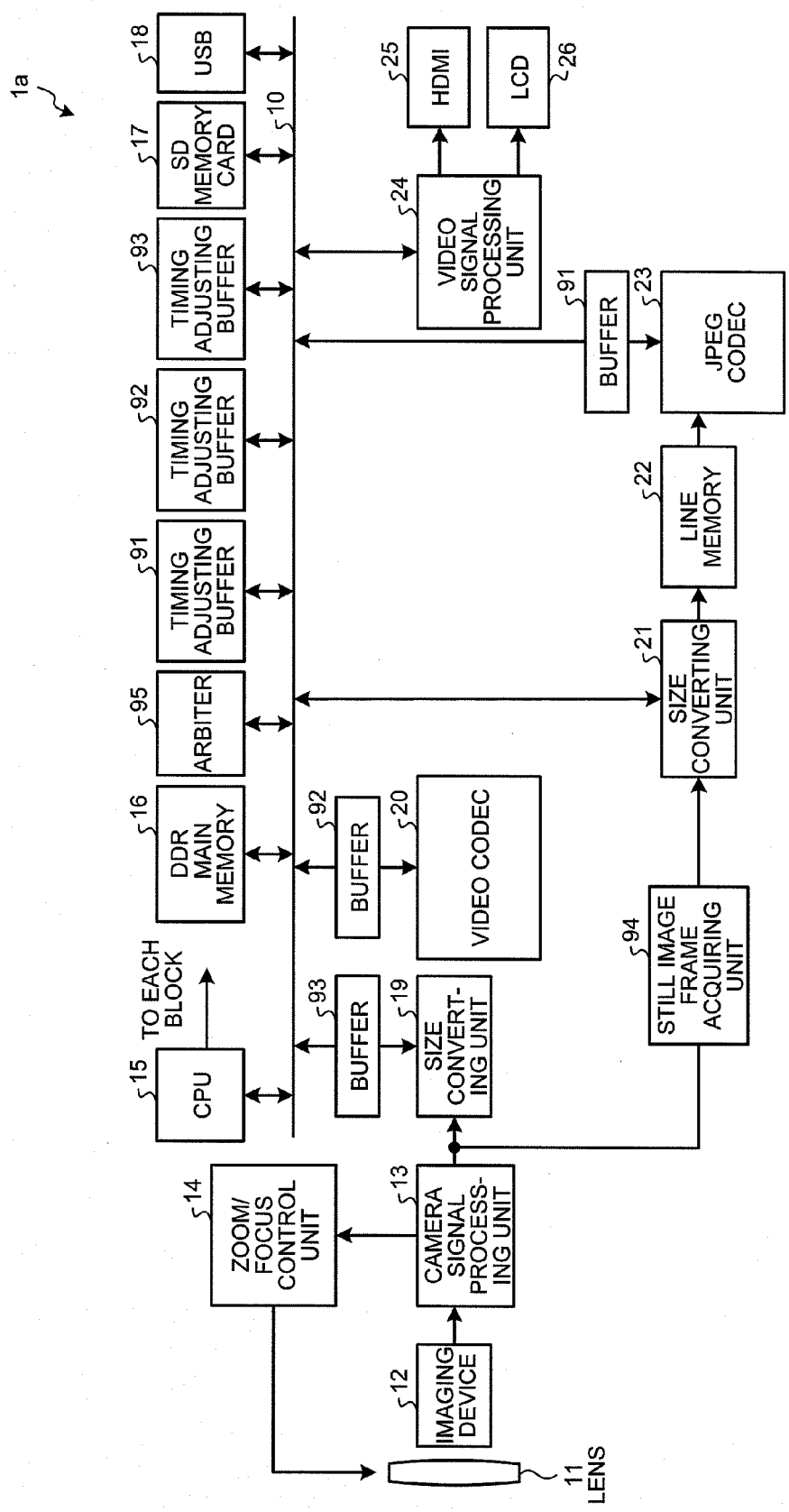
FIG. 15 is a block diagram that illustrates an image processing apparatus according to a second embodiment of the present invention.

Next, a second embodiment of the present invention will be described. FIG. 15 is a block diagram that illustrates an image capturing apparatus according to the second embodiment. As illustrated in FIG. 15, in an image capturing apparatus 1a according to the second embodiment, a still image frame acquiring unit 94 is provided. As described above, in a case where all the frames of the motion picture data configured by 60 frames per second are processed in a high-speed capturing route R1, all the data may be sequentially transmitted to a size converting unit 21, a line memory 22, and a JPEG codec 23, and particularly, the still image frame acquiring unit 94 does not need to be provided.

In a case where a user captures a still image by pressing the shutter at arbitrary timing while capturing a motion picture or reproducing a motion picture, the shutter timing is input to the still image frame acquiring unit 94, and image data of a predetermined frame flows to the size converting unit 21 side from motion picture data output from a camera signal processing unit 13 or decoded motion picture data written in the DDR main memory 16 in accordance with the switching operation thereof or the like.

In addition, in the image capturing apparatus 1a according to the second embodiment, a plurality of buffers (timing adjusting buffer) 91 to 93 used for arbitrating the use of a bus 10 of a DDR main memory 16 are arranged at a time when motion picture data is written into the DDR main memory 16, a time when encoded data supplied from the JPEG codec 23 is written into the DDR main memory 16, and the like.

Furthermore, the image capturing apparatus 1a includes an arbiter 95 that serves as an arbitration unit controlling the plurality of buffers 91 to 93. While the still image data passing through the high-speed capturing route R1 is encoded and is written into the DDR main memory 16, there is a case where the bandwidth of the bus 10 of the DDR main memory 16 is insufficient at specific timing, and accordingly there is a case where it is necessary to adjust the bandwidth of the bus using the plurality of buffers 91 to 93.

Here, although only the butters 91 to 93 are illustrated in the figure, buffers may be arranged in an SD memory card 17, a video signal processing unit 24, or the like, if needed.

Control of Arbiter 95

FIG. 16 is a diagram that illustrates the control operation of the arbiter 95. In this example, a case will be described in which the arbiter 95 adjusts: operation (A) of writing motion picture data of which the size has been converted by the size converting unit 19 into the DDR main memory 16; operation (B) of a video codec 20 reading data from the DDR main memory 16; operation (C) of the video codec 20 writing data into the DDR main memory 16; and operation (D) of the JPEG codec 23 writing encoded data into the DDR main memory 16.

In FIG. 16, a request signal transferring an access request for accessing the DDR main memory 16 from the JPEG codec 23 to the arbiter 95 and a wait signal received from the arbiter 95 when the access is not permitted at the time of read operation of the size converting unit 19 or the video codec 20 and write operation of the video codec 20 are illustrated. When a request signal is received, the arbiter 95 does not receive any other request signal and permits an access when the bandwidth of the bus 10 of the DDR main memory 16 is vacant.

In addition, when a plurality of request signals are received by the arbiter 95, for example, at timing T21, a video codec reading request signal having a priority level of "3" and a video codec writing request signal having a priority level of "4" are output. In such a case, the arbiter 95 outputs a video codec writing wait signal, stops video codec writing, and performs the process of the video codec reading having a higher priority level of "3".

Furthermore, while the video codec writing that outputs a request signal at timing T22 performs writing, the size converting unit 19 having a priority level of "2" outputs a request signal. However, thereafter, a request signal is output from the JPEG codec 23 having a higher priority of "1". Accordingly, since the priority level of the size converting unit 19 is lower than that of the JPEG codec 23, a waiting state is formed again, and at timing T24 when the write operation of the JPEG codec 23 is completed, the write operation of the size converting unit 19 is permitted.

As above, at the time of waiting that frequently occurs, by accumulating data in the buffers 91 to 93, the operations of the size converting unit 19, the video codec 20, and the JPEG codec 23 are not interrupted. As described above, in order to make high-speed still image capturing at the time of capturing a motion picture possible, the image capturing apparatus 1a according to the second embodiment directly encodes a still image frame in real time without writing the still image frame into the DDR main memory 16. Accordingly, compared to a conventional route in which, after the raw data of the still image frame, once, is written into the DDR main memory 16, the data is encoded, the load of the DDR main memory 16 on the bandwidth of the bus 10 can be reduced, and, as a result, high-speed still image capturing can be performed. In other words, conventionally, in simultaneously with capturing a motion picture, a plurality of still images per second, at most, only 10 still images per second can be captured. In contrast to this, according to the second embodiment, by encoding a still image frame in real time without writing the still image frame into the DDR main memory 16 and then writing the still image frame into the DDR main memory 16, for example, the still image frames of all the frames of the motion picture data configured by 60 frames per second can be acquired.

In addition, when high-speed still image capturing is performed at the time of capturing a motion picture, there are cases where the bandwidth of the DDR main memory 16 is insufficient. Even in such cases, as in the second embodiment, by arranging the buffers 91 to 93 and the like and performing the arbitration of the bus 10 using the arbiter 95, the process for the DDR main memory 16 can be performed in a smooth manner.

Furthermore, while the buffer 91 is arranged so as to adjust the timing when the bus bandwidth of the DDR main memory 16 is used by the JPEG codec 23, as described above, the JPEG codec 23 according to the second embodiment has the three-side configuration of eight-line memories. Accordingly, a part of the line memory may be used instead of the buffer 91.

Also in the second embodiment, similarly to the first embodiment, the image capturing apparatus capable of performing high-efficiency processing and high-speed processing and implementing low cost in capturing a still image can be provided. Particularly, also at the time of capturing a motion picture, by performing efficient still image processing, high-speed still image processing can be performed at lower cost.

The present invention is not limited to the above-described embodiments, and various changes can be made therein in a range not departing from the concept of the present invention.

For example, in the above-described embodiments, while the configuration of hardware has been described, the present invention is not limited thereto, but an arbitrary process may be realized by causing a central processing unit (CPU) to execute a computer program. In such a case, the computer program may be stored using various types of a non-transitory computer readable medium and be supplied to a computer. The non-transitory computer readable medium includes various types of a tangible storage medium. Examples of the non-transitory computer readable medium include a magnetic recording medium (for example, a flexible disk, a magnetic tape, or a hard disk drive), a magneto-optical recording medium (for example, a magneto-optical disc), a CD-read only memory (ROM), a CD-R, a CD-RW, and a semiconductor memory (for example, a mask ROM, a programmable ROM (PROM), an erasable PROM (EPROM), a flash ROM, or a random access memory (RAM)). In addition, the program may be supplied to a computer by various types of transitory computer readable medium. Examples of the transitory computer readable medium include an electric signal, an optical signal, and an electromagnetic wave. The transitory computer readable medium may provide supply the program to a computer through a wired communication path such as an electric line or an optical fiber or a wireless communication path.

According to the present invention, an image processing apparatus, an image processing method, and a program product capable of encoding still image data at a high speed in real time and storing the encoded data into a main memory in parallel with capturing a motion picture can be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
    an imaging device;
    a main memory that stores motion picture data acquired by the imaging device;
    a motion picture compressing unit that compresses the motion picture data stored in the main memory;
    a still image frame acquiring unit that acquires a still image frame at arbitrary timing from the motion picture data acquired by the imaging device;
    a line memory that stores still image data that is a part of the still image frame acquired by the still image frame acquiring unit, a size of the line memory is less than a size of the still image frame; and
    a still image compressing unit that performs a compression process of the still image data stored in the line memory,
    wherein the still image compressing unit compresses the still image data in real time in parallel with storage of the motion picture data into the main memory, and
    wherein the main memory stores the motion picture data and stores compressed data that is compressed in real time by the still image compressing unit.

2. The image processing apparatus according to claim 1, further comprising a timing adjusting buffer,
    wherein the timing adjusting buffer adjusts timing when the motion picture data is stored in the main memory and timing when the compressed data compressed in real time by the still image compressing unit is stored in the main memory.

3. The image processing apparatus according to claim 1,
    wherein the line memory is configured by n lines (here, n is an integer that is one or more) of three or more sides, and
    wherein a part of the memory serves as a buffer absorbing variations in a processing rate in the process of compressing the still image data performed by the still image compressing unit and serves as a buffer adjusting timing when the compressed data after the compression process is stored in the main memory.

4. The image processing apparatus according to claim 1, further comprising a size converting unit,
    wherein the size converting unit converts a size of the still image frame acquired by the still image frame acquiring unit in real time.

5. The image processing apparatus according to claim 1, further comprising a motion picture size converting unit,
    wherein the motion picture size converting unit converts a size of the motion picture data acquired by the imaging device, and
    wherein the main memory stores the motion picture data of which the size is converted by the motion picture size converting unit.

6. The image processing apparatus according to claim 1,
    wherein the main memory stores motion picture data acquired by decompressing compressed motion picture data read from an external memory,
    wherein the line memory stores still image data that is a part of the still image frame acquired at arbitrary timing from any one of the motion picture acquired by the imaging device and the decompressed motion picture data stored in the main memory, and
    wherein the still image compressing unit performs a compression process of the still image data stored in the line memory.

7. The image processing apparatus according to claim 1, further comprising:
    a main image size converting unit; and
    a sub-image size converting unit,
    wherein the main image size converting unit generates main image data by converting a size of the still image frame acquired by the still image frame acquiring unit in real time, and
    wherein the sub-image size converting unit generates sub-image data by converting the size of the still image frame acquired by the still image frame acquiring unit in real time.

8. The image processing apparatus according to claim 7, wherein the sub-image size converting unit generates the sub-image data by converting a size of the main image data generated by the main image size converting unit in real time.

9. The image processing apparatus according to claim 7,
    wherein the line memory stores a part of the main image data generated by the main image size converting unit, and
    wherein the still image compressing unit compresses the main image data in real time in parallel with storing the motion picture data in the main memory and stores the sub-image data generated by the sub-image size converting unit in the main memory without being compressed.

10. The image processing apparatus according to claim 7,
    wherein the main image size converting unit and the sub-image size converting unit includes a size conversion line memory, and
    wherein the size conversion line memory includes a line memory storing a part of the still image frame, the main image data, or the sub-image data.

11. The image processing apparatus according to claim 7, wherein the sub-image size converting unit generates the sub-image data that is a thumbnail of the still image frame.

* * * * *